(12) United States Patent
Neyedly

(10) Patent No.: US 12,179,903 B2
(45) Date of Patent: Dec. 31, 2024

(54) AIRCRAFT-BASED MODULAR DOOR PANEL ASSEMBLY

(71) Applicant: 1281329 Alberta Ltd., Calgary (CA)

(72) Inventor: Ross James Neyedly, Calgary (CA)

(73) Assignee: 1281329 Alberta Ltd., Calgary (CA)

( * ) Notice: Subject to any disclaimer, the term of this patent is extended or adjusted under 35 U.S.C. 154(b) by 70 days.

(21) Appl. No.: 18/298,973

(22) Filed: Apr. 11, 2023

(65) Prior Publication Data

US 2024/0343377 A1    Oct. 17, 2024

(51) Int. Cl.
*B64C 1/14*    (2006.01)
*B64D 11/06*   (2006.01)
*B64D 41/00*   (2006.01)

(52) U.S. Cl.
CPC .......... *B64C 1/1461* (2013.01); *B64C 1/1484* (2013.01); *B64D 11/0639* (2014.12); *B64D 11/0698* (2014.12); *B64D 41/00* (2013.01)

(58) Field of Classification Search
CPC . B64C 1/1461; B64C 1/1484; B64D 11/0639; B64D 11/0698; B64D 41/00
See application file for complete search history.

(56) References Cited

U.S. PATENT DOCUMENTS

| | | | |
|---|---|---|---|
| 8,807,482 B2* | 8/2014 | Woodland | B64C 1/18 244/129.4 |
| 9,663,217 B1* | 5/2017 | Da Silva | B64F 5/40 |
| 2010/0206992 A1* | 8/2010 | Woodland | B64C 1/36 244/137.1 |

* cited by examiner

*Primary Examiner* — Valentina Xavier
(74) *Attorney, Agent, or Firm* — Baker Botts L.L.P.

(57) ABSTRACT

In one embodiment, a modular door panel assembly for an aircraft comprises a door surround that interfaces with a door aperture of the aircraft to ensure aircraft pressurization, a first hole in an upper portion of the door surround configured to accommodate a modular upper panel assembly such that a portion of the door surround around the first hole is capable of interfacing with the modular upper panel assembly to ensure aircraft pressurization, a second hole in a lower portion of the door surround configured to accommodate a modular lower panel assembly such that a portion of the door surround around the second hole is capable of interfacing with the modular lower panel assembly to ensure aircraft pressurization, and a strut actuator aperture below the second hole that is configured to interface with an articulated strut to ensure pressurization.

44 Claims, 16 Drawing Sheets

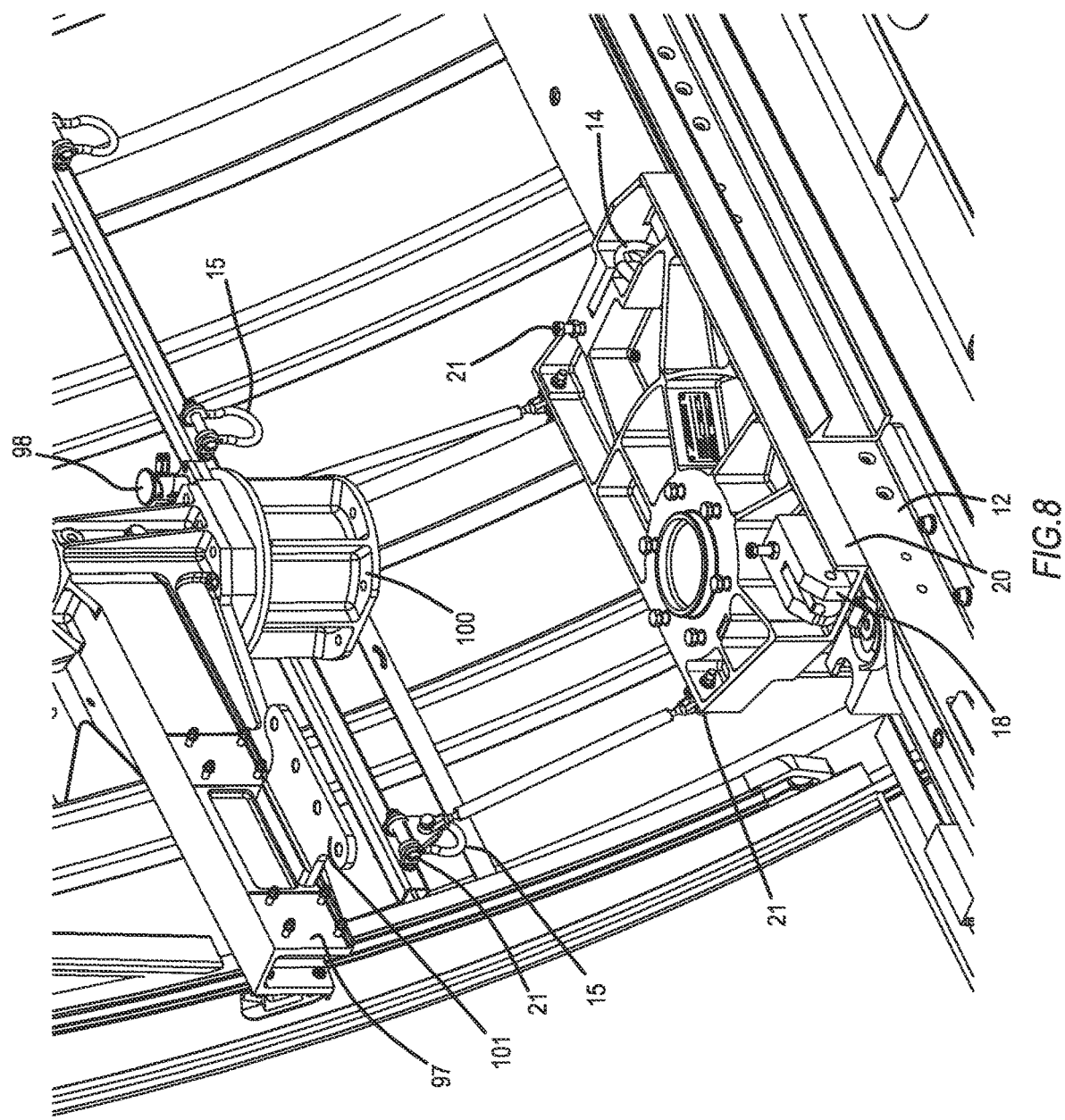

AIRCRAFT-BASED MODULAR DOOR PANEL ASSEMBLY

TECHNICAL FIELD

This disclosure relates to the design and use of aircraft-based platforms, and in particular relates to modular assemblies for sensing, search, monitoring, surveillance, and response activities.

BACKGROUND

Aircraft-based platforms are ideally suited for time sensitive emergencies, as well as routine sensing, search, monitoring, surveillance, and response activities. Various types of mission systems and installation methodologies are utilized for the purpose of maximizing the capability and effectiveness of the aircraft employed in these activities.

Typically, these systems involve permanent modifications to a fleet of aircraft to maintain mission readiness. In most cases, because these systems are costly to install and upgrade, they are usually undertaken in the context of "minimum but adequate". This approach can suffer from performance deficiencies, limited range of capabilities, delays in implementation and fielding. Whereas a non-permanent modular system could achieve rapid fielding across a fleet of aircraft and allow advanced technologies to be upgraded off aircraft and be ready for use. Aircraft and system upgrade prioritization can be implemented at a reduced cost.

Currently, systems and methods associated with resolution of the aforementioned deficiencies are inadequate and costly, preclude simultaneous air drop operations, inhibit upgrade opportunities, increase the probability of aircraft accidents during airborne operations, and leave large, slow-moving cargo aircraft vulnerable to low altitude missile threats.

Accordingly, there is an on-going need to achieve an improved, flexible, rapidly installed, non-dedicated door panel assembly that permits modularity and easy reconfiguration to adapt to different aircraft missions, systems, and payloads.

Further, there is a need for such a door panel assembly that is retractable, removable, stowable, and portable.

Further, there is a need for such a door panel assembly that does not interfere with backend aircraft operations.

Still further, there is a need for such a door panel assembly that does not require a pallet or aircraft modifications to enable its use on the ground or in flight.

SUMMARY OF PARTICULAR EMBODIMENTS

The present disclosure describes a door panel assembly for an aircraft that is modular and reconfigurable to support a variety of aircraft missions, systems, and payloads by accommodating various onboard components and systems without requiring modifications to the airframe of the aircraft.

In particular embodiments, the modular door panel assembly comprises a door surround that interfaces with a door aperture of the aircraft to ensure aircraft pressurization, a first hole in an upper portion of the door surround, a second hole in a lower portion of the door surround, a close-out panel located below the second hole and configured to interface with a plethora of system components to ensure pressurization and/or a strut actuator aperture located below the second hole and configured to interface with an articulated strut to ensure pressurization. Specifically, the first hole may be configured to accommodate a modular upper panel assembly such that a portion of the door surround around the first hole is capable of interfacing with the modular upper panel assembly in a way that ensures aircraft pressurization. Similarly, the second hole may be configured to accommodate a modular lower panel assembly such that a portion of the door surround around the second hole is capable of interfacing with the modular lower panel assembly in a way that ensures aircraft pressurization.

In particular embodiments, the door surround can be permanently or temporarily installed in the aircraft. In doing so, the modular door panel assembly may replace an existing door, an emergency exit, or an escape port of the aircraft. In particular embodiments, the modular door panel assembly comprises a retract track fixture connecting the door surround and the door aperture of the aircraft, allowing the door surround to be retracted and stowed and allowing the reverse and rapidly installed and removed.

In particular embodiments, the modular door panel assembly may be configured to incorporate features suitable for manned observation and scanning. In particular embodiments, one or both of the modular upper panel assembly and the modular lower panel assembly comprises a square or other geometric-shaped window, a protruding window, a flush window, or a protruding panel, so as to facilitate the observer or scanner in performing required operations.

In particular embodiments, the modular door panel assembly comprises a scanner seat assembly attached to at least one of the door surround, the modular upper panel assembly, and the modular lower panel assembly. In the same or further embodiments, the scanner seat assembly is additionally or alternatively connected to a cargo handling system rail and/or the fuselage of the aircraft via adaptive mounting fixtures. In particular embodiments, the scanner seat assembly comprises a support post that interfaces with the cargo handling system via the floor of the aircraft and an extendable pivot arm that interfaces with the support post, such that the scanner seat assembly can be adjusted and moved in multiple directions. In the same or further embodiments, the scanner seat assembly is outboard of the path of cargo as the cargo travels forward and aft within the aircraft such that the scanner seat assembly does not interfere with aircraft operations.

In particular embodiments, the modular door panel assembly comprises one or more collapsible modular workstation assemblies mounted to the cargo handling system rail via adaptive mounting fixtures and/or the fuselage of the aircraft via adaptive mounting fixtures. In the same or further embodiments, the retractable modular workstation assembly comprises one or more of a display module, a human-machine interface module, and a computer module. Specifically, in particular embodiments, each of these modules can be physically connected via one or more hinges to another module or a frame of the collapsible modular workstation assembly. The one or more hinges enable the module to be moved between a deployed position and a stowed position. In some embodiments, each of the modules further comprises a module locking hinge to secure the module in the stowed position. In particular embodiments, the collapsible modular workstation assembly can be rotated and/or translated outboard of the path of cargo as the cargo travels forward and aft within the aircraft such that the collapsible modular workstation assembly does not interfere with air drop operations.

In particular embodiments, the modular door panel assembly may be configured to incorporate features suitable for payload launching and control. In particular embodiments, at least one of the modular upper panel assembly and the modular lower panel assembly comprises at least one of a plurality of ejection tube ports. In particular embodiments, the modular door panel assembly comprises an ejection system which permits ejection of an ejection system compliant payload from the interior of the aircraft to the exterior of the aircraft. In the same or further embodiments, the ejection system is coupled to the interior of the door aperture assembly, wherein the ejection system is capable of being uncoupled or removed from: a first position wherein the ejection system is coupled to the modular door panel assembly via a modular valve assembly and a second position wherein the ejection system is uncoupled and/or removed and stowed in the aircraft. When coupled to or uncoupled from the ejection system, the modular valve assembly may maintain aircraft pressurization. In the same or further embodiments, the ejection system maintains an electrical data link via a harness or wireless methods to support ejection and provide payload power and command, control, and guidance telemetry upload and download.

In particular embodiments, the modular door panel assembly may be configured to incorporate additional features suitable to add capability, incorporate sensors and for performing other missions. In particular embodiments, at least one of the modular upper panel assembly and the modular lower panel assembly may have side nadir and zenith scan coverage. In particular embodiments, at least one of the modular upper panel assembly and the modular lower panel assembly may comprise a transparency compliant with optical, multi and hyper-spectral sensors, and electro-optical sensors, and other devices that operate within the electromagnetic spectrum. As known in the field of aircraft design, the transparency may be, e.g., a windshield, canopy, window, lens, or any component that is constructed of transparent materials. In particular embodiments, at least one of the modular upper panel assembly and the modular lower panel assembly may comprise a transparency compliant with electromagnetic spectrum. In particular embodiments, the modular door panel assembly may comprise a rigid or non-rigid ballistics armor covering the interior surface of the modular door panel assembly. In particular embodiments, the modular door panel assembly may comprise a rigid or non-rigid electromagnetic spectrum shielding covering the exterior and/or interior surface and peripheral pressurization seal of the modular door panel assembly. In particular embodiments, the modular door panel assembly may comprise one or more side coverage modular inserts, which may provide: a protruding or flush mount radome panel to support at least one of optical sensors, multi-spectral sensors, hyper-spectral sensors and electro-optical sensors; a protruding or flush mount radome panel to support electromagnetic spectrum sensors; an optical glass insert for hyper-spectral or other electro-optical (EO) sensors; a GPS/SATCOM antenna with or without Articulated Sensor Assembly; or an upper and/or lower panel auxiliary power unit (APU) assembly. In particular embodiments, the modular door panel assembly may comprise a ruggedized environmental storage and loading container.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method and a system, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 is a perspective view depicting installation of a stanchion post mounting plate onto the aircraft floor, more fully delineating the connection of the scanner seat assembly.

DESCRIPTION OF EXAMPLE EMBODIMENTS

Assembly

The present disclosure is now described in terms of the FIGURES to more fully delineate in detail the scope, materials, components, conditions, and methods associated with the design and deployment of the present disclosure. Many of the parts and components of the present disclosure are hereinafter described as being "assemblies." As used herein, the word "assembly" or "assemblies" refers to the totality of related parts and pieces associated with a given component and its operability and is not to be construed as limiting to a particular piece, part, or operation.

The description herein is made with the understanding that the skilled person in the field of designing and using aircraft-based platforms for sensing, search, monitoring, surveillance, and response activities is familiar with standard aircraft features such as various structural elements including side doors, side door operations, floor tie down elements and systems, cargo restraint and handling (CRH) rails, and the like, as utilized on C-130 aircraft and the like. No detailed description of such features is believed necessary to enable one skilled in the art to understand and implement the present disclosure.

In general, the present disclosure comprises a novel design and integration approach to the configuration, capability, and installation of an aircraft-independent, portable, modular door panel assembly accommodating various manned observation and stores ejection system launch and control assemblies as used in search and rescue, oil spill characterization, aerial refueling, missile scanning, and other airborne missions. The integration of the aforementioned assemblies in the non-dedicated manner provides the desired portability, commonality, and modularity to enable cost effective utilization of advanced technologies incorporated within the present disclosure across multiple aircraft types.

Figure 1:
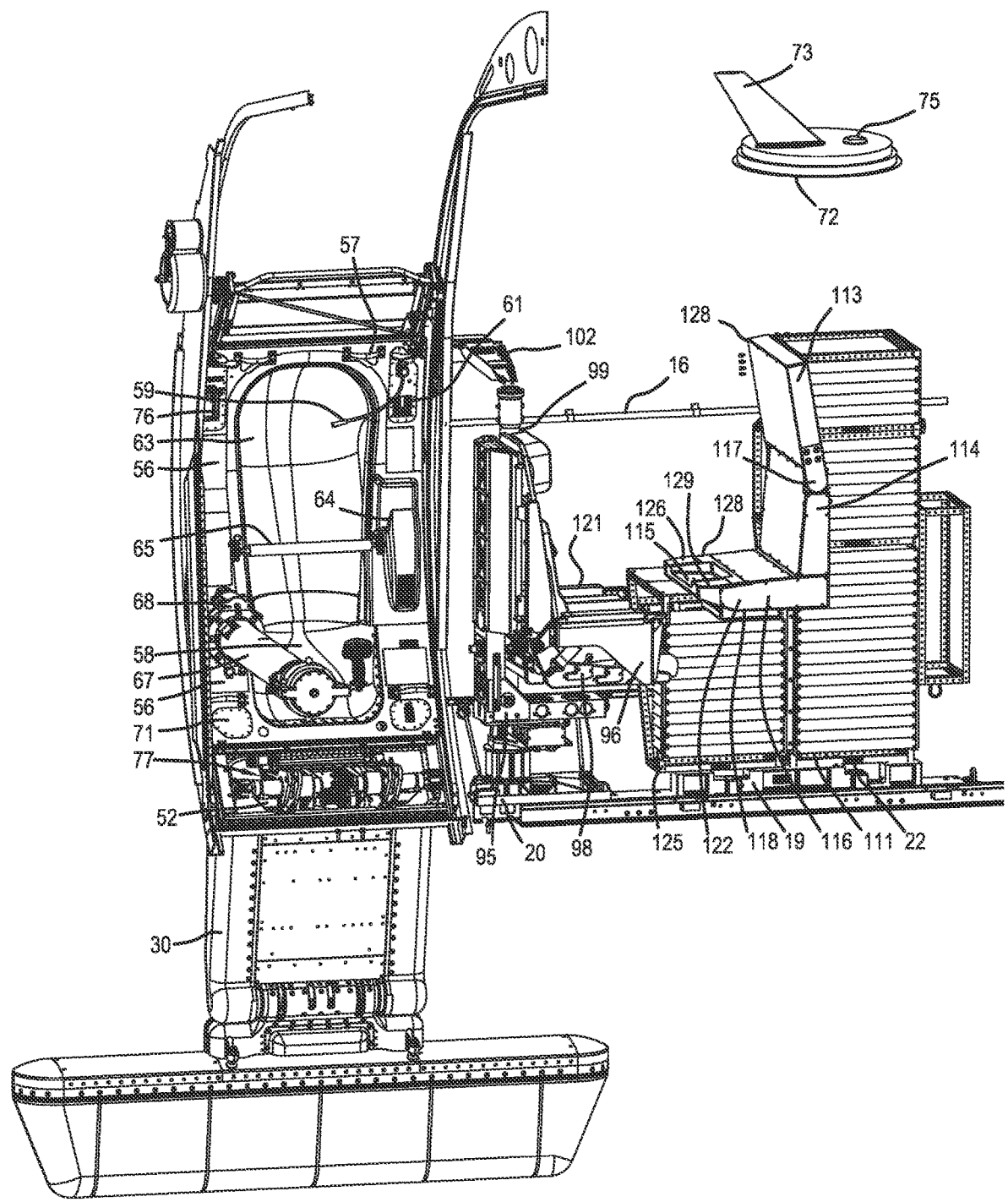
FIG. 1 is a perspective view of an embodiment of a modular door panel assembly, with the depicted components and the articulated strut in the deployed and operable position as could normally be installed on a host aircraft.
Figure 2:
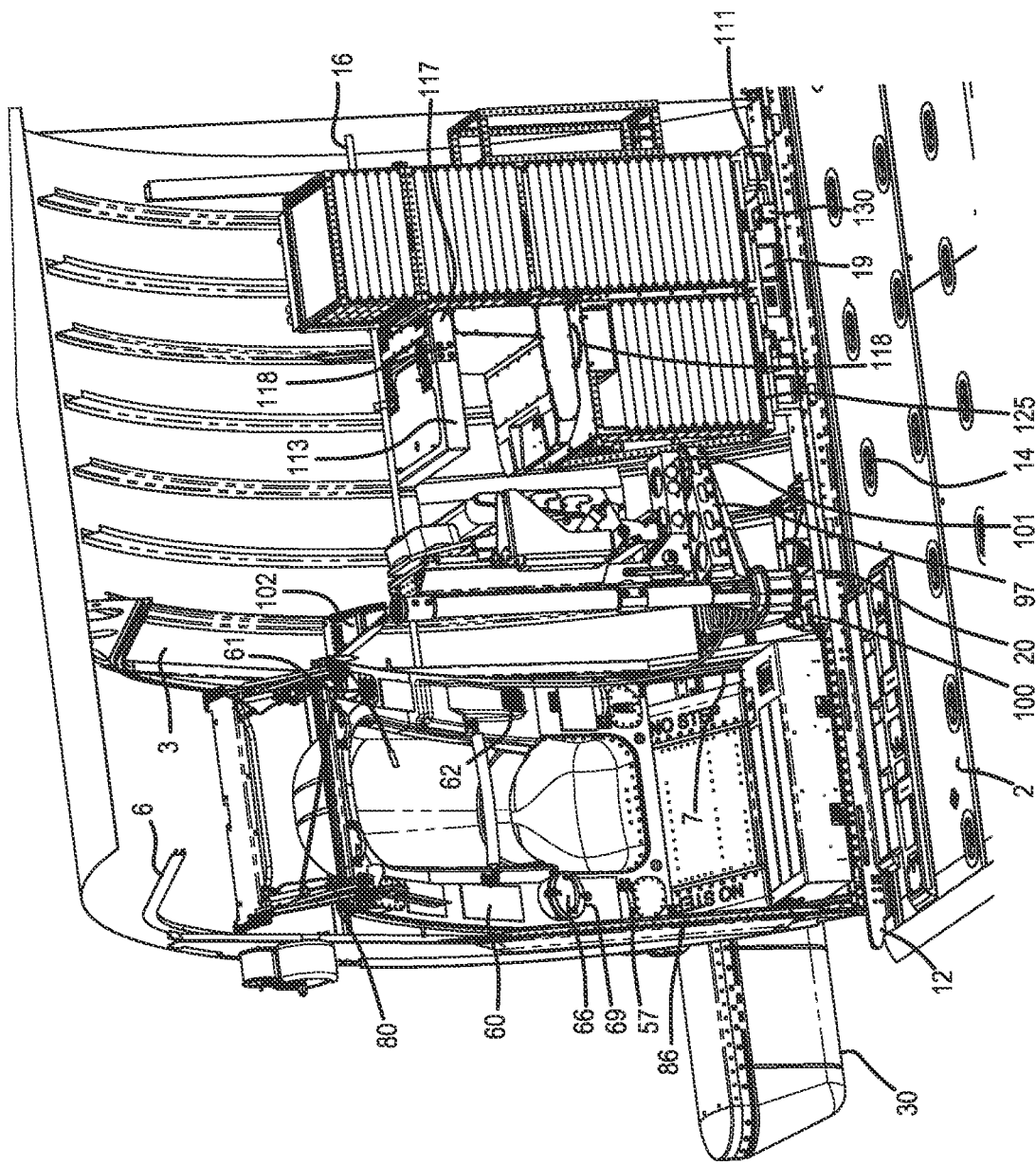
FIG. 2 is a perspective view of an embodiment of a modular door panel assembly, with the depicted components and the articulated strut in the retracted and stowed position as mounted to a cargo rail and floor support system of a host aircraft.
Figure 3:
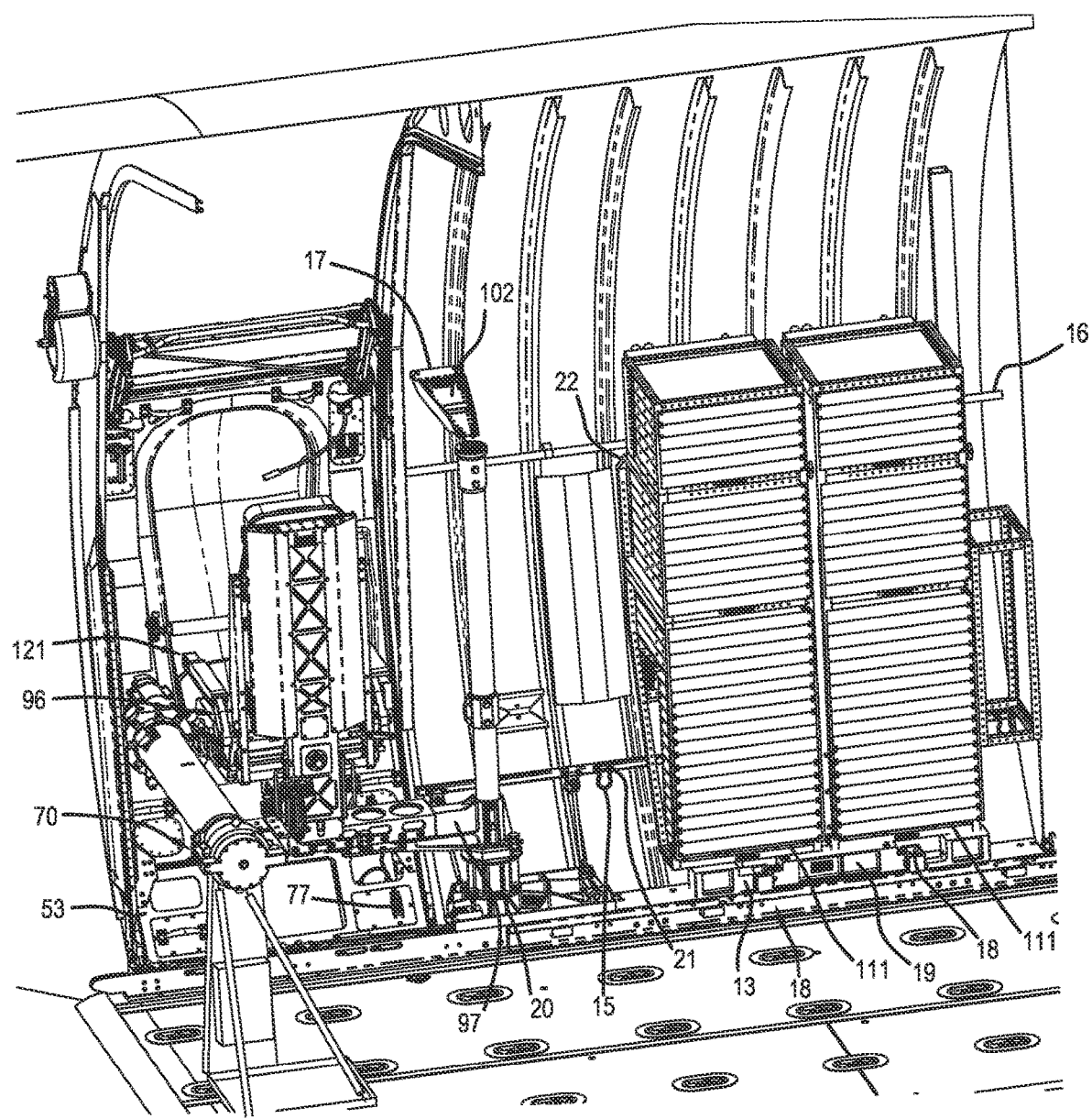
FIG. 3 is a perspective view of an embodiment of a modular door panel assembly, with the depicted components in the deployed and operable position, and with the articulated strut removed and a modular close-out panel assembly installed in its place.

FIGS. 1, 2, and 3 illustrate the particular embodiments of the system architecture of the modular door panel assembly. In particular embodiments, the modular door panel assembly can include various CRH rail/cargo floor mounted or non-floor mounted stores ejection launch and control systems. In particular embodiments, the modular door panel assembly can also include primary sub-assemblies which can be used for functionality and employment of various embodiments disclosed herein. As an example and not by way of limitation, sub-assemblies can include an articulated strut assembly, a door surround assembly, a door surround retract assembly, a scanner seat assembly, a modular workstation and control interface assembly, a modular LRU rack and support assembly and a stores ejection tube assembly. When combined, these various sub-assemblies can enable a standard cargo aircraft to be rapidly re-configured as a multi mission platform, or alternatively, enable an aircraft to be equipped with rapidly installed advanced systems which could otherwise not be installed due to the high cost and long lead time for dedicated airframe modifications.

In particular embodiments, as shown in FIGS. 1 through 3, the modular door panel assembly may be used aboard a host aircraft 1, as an example and not by way of limitation, Lockheed C-130 Series, Leonardo/Alenia C-27 Series, Casa 295 Series, A400 Series, or other suitable aircraft. The existing aircraft door 4 can be removed or opened vertically upward and stowed in the locked position without being removed, such that the modular door panel assembly may replace the existing aircraft door.

As depicted in FIGS. 1, 2, 3, and 4, in particular embodiments, the modular door panel assembly may include a door surround that may interface with a door aperture of the aircraft in a way that ensures aircraft pressurization. The door surround may be permanently or temporarily installed in the door aperture of the aircraft. Furthermore, in some embodiments, the door surround may be designed to be compliant with fuselage outer mold-line of the aircraft. As an example and not by way of limitation, the door surround may replace an existing door of the aircraft. Additionally or alternatively, the door surround may replace an emergency exit or escape port of the aircraft.

In particular embodiments, the modular door panel assembly may comprise either a single piece door surround 1120 (see FIG. 11) or a segmented two-piece door surround 51 incorporating a modular upper panel assembly 54 and a modular lower panel assembly 55. For example, the single piece door surround 1120 may be a unitary structure formed as one piece. Specifically, the modular door panel assembly may be designed to include a first interface aperture in an upper portion of the modular door panel assembly and a second interface aperture in a lower portion of the modular door panel assembly. As an example and not by way of limitation, the upper portion and the lower portion of the modular door panel assembly may be continuous with each other. In particular embodiments, each is configured to ensure aircraft pressurization. Similarly, the modular upper panel 54 can be configured to accommodate the modular lower panel assembly 55 in a way that ensures aircraft pressurization. While the embodiments disclosed herein may be described using the term aperture, other suitable terminology may be used interchangeably, for example, a hole.

Figure 4:
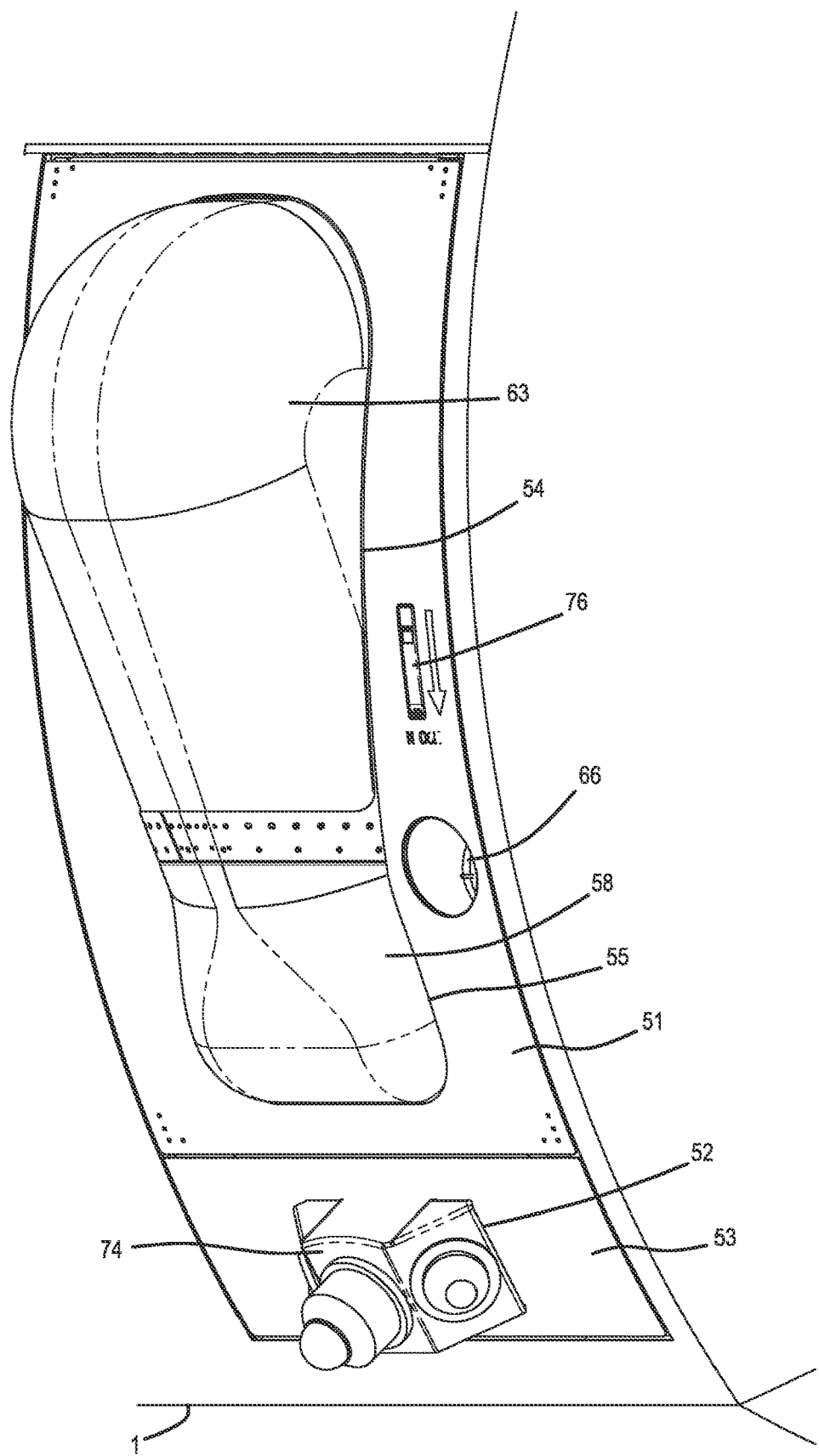
FIG. 4 is an exterior perspective view of an embodiment of a modular door panel assembly and a modular close-out panel assembly.
Figure 5A:
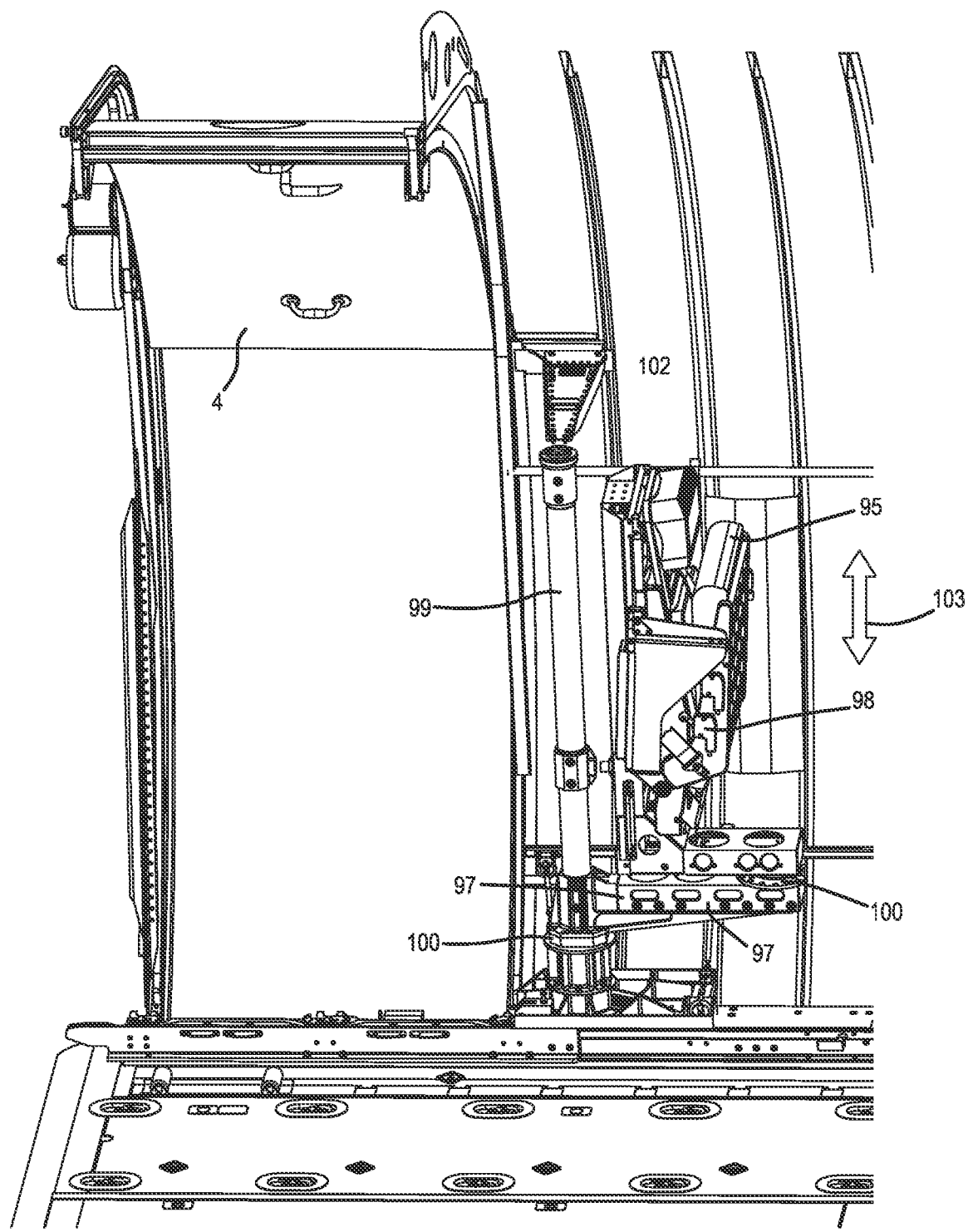
FIGS. 5A-5E are interior perspective views of a scanner seat assembly, depicting multiple adjustable motion paths of the seat.
Figure 5B:
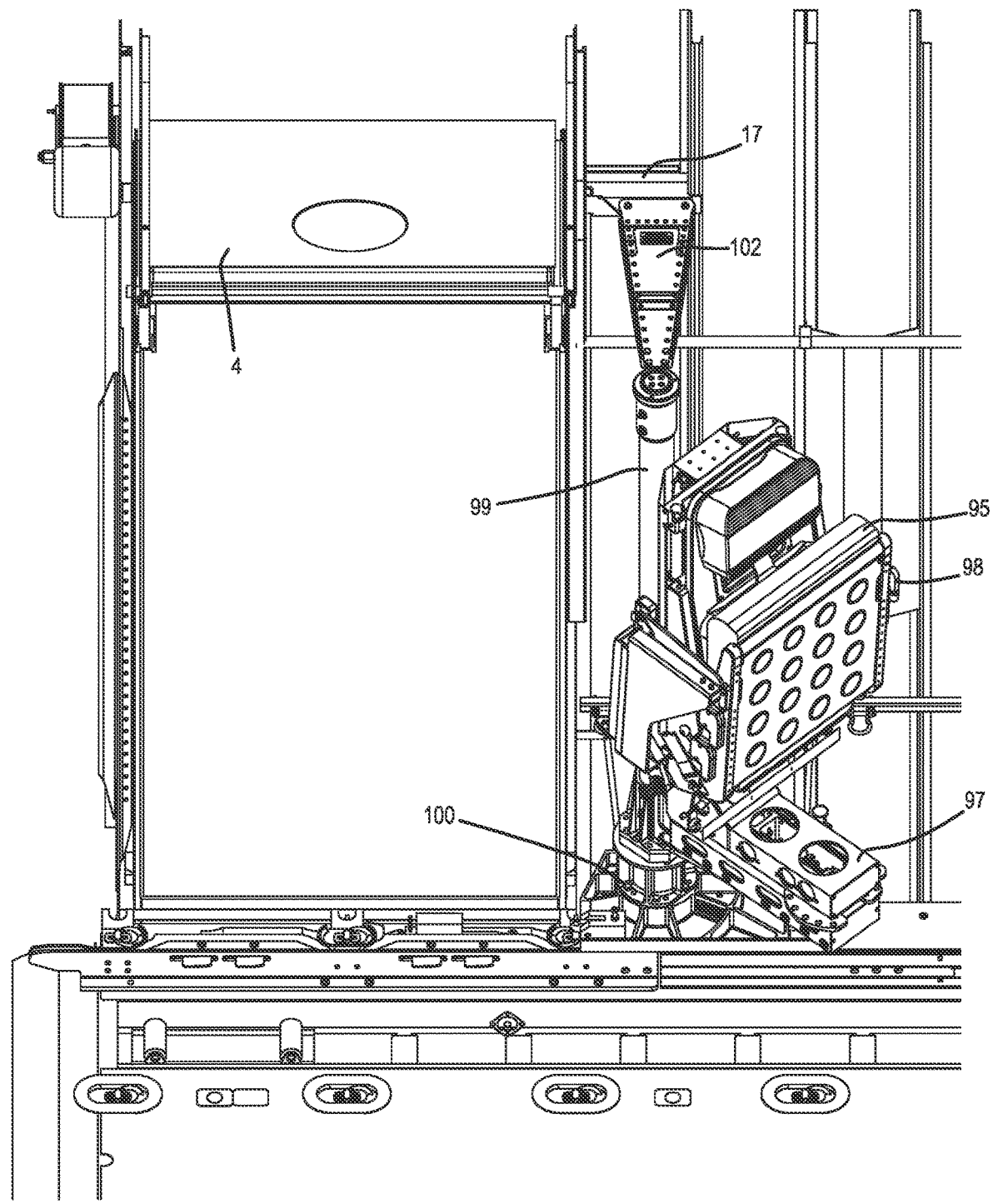
Figure 5C:
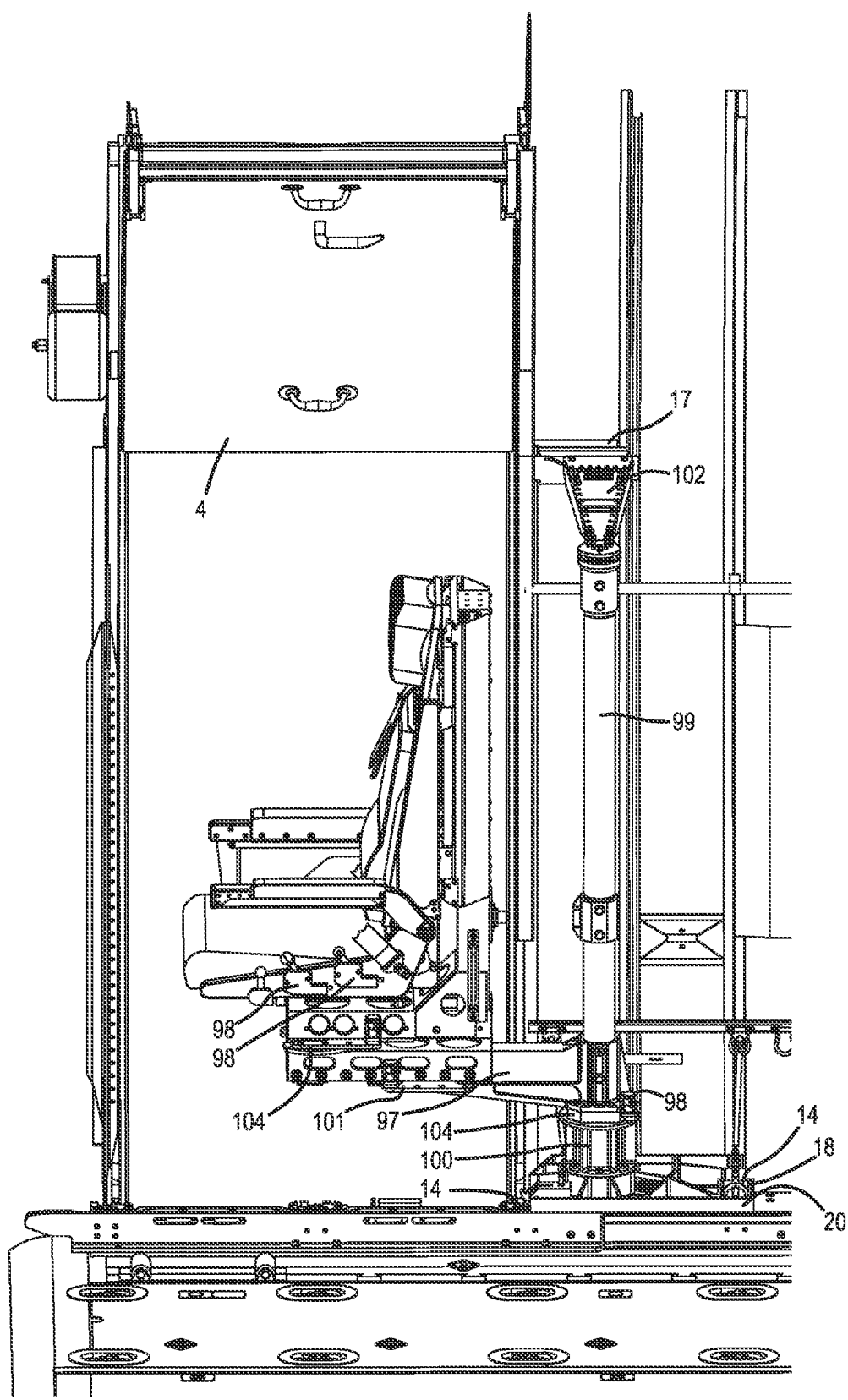
Figure 5D:
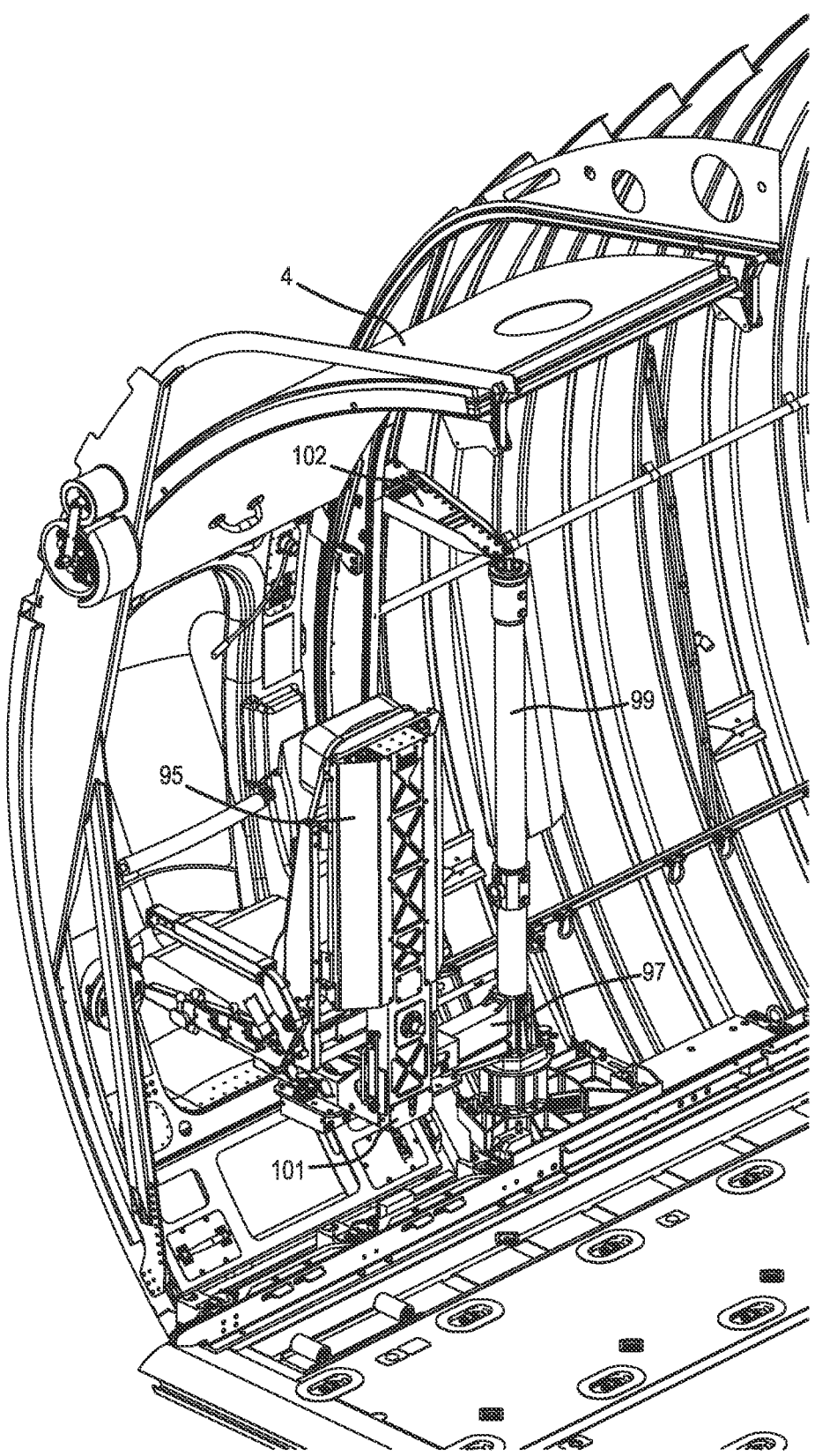
Figure 5E:
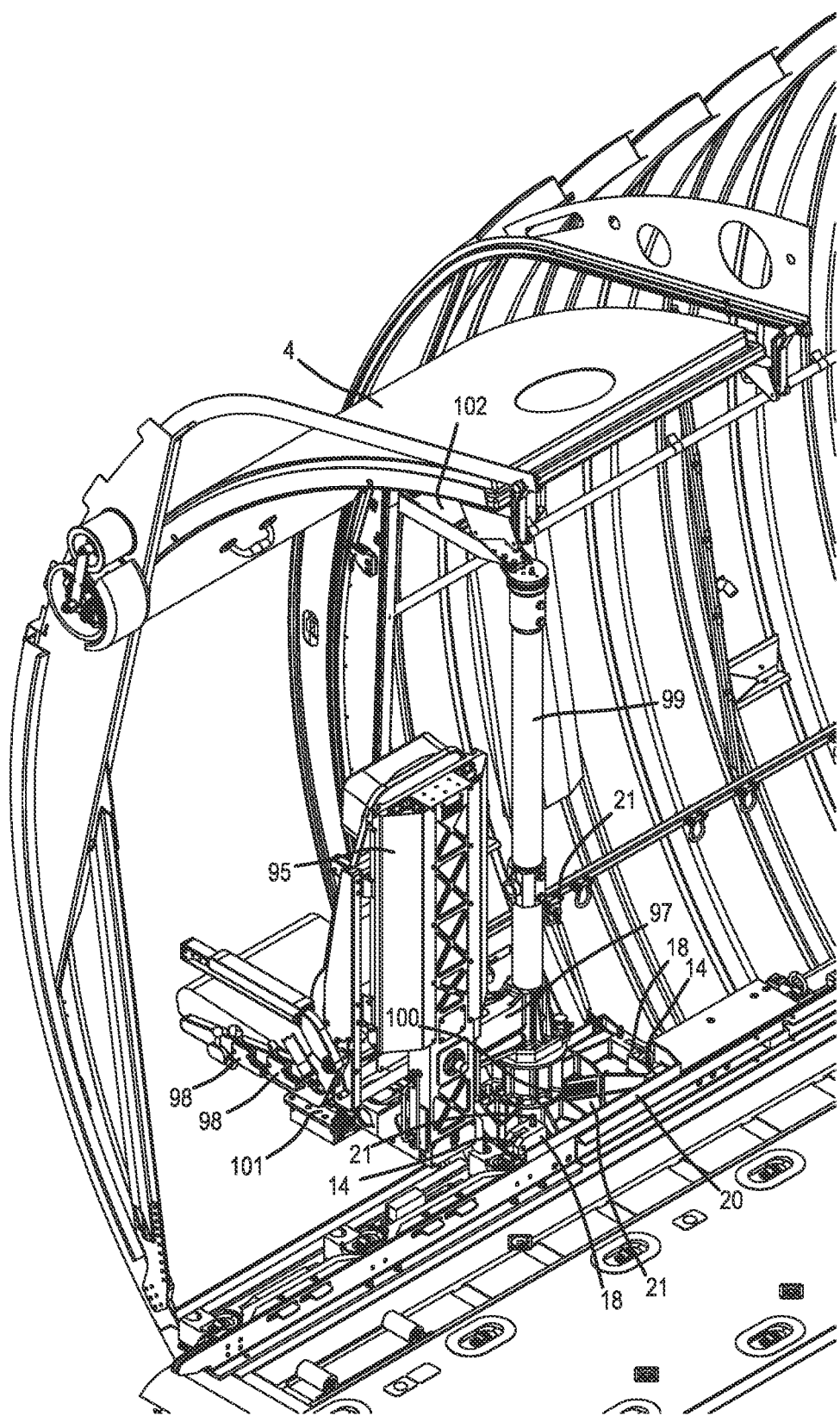

In particular embodiments, the modular door panel assembly may further comprise an aperture 52, which can be positioned below the single piece door surround or the segmented two-piece door surround and configured to interface with an articulated strut 30 to ensure pressurization. As an example and not by way of limitation, the modular lower panel assembly 55 or the aperture 52 may accommodate installation of the articulated strut 30, sensors, antennas or other equipment exterior to the aircraft. Additionally, in some embodiments, the aperture 52 can accommodate the transit of the articulated strut 30 from the interior side to the exterior side of the host aircraft while forming a pressurized seal around the articulated strut 30. In particular embodiments, when the single piece door surround or a segmented two-piece door surround assembly is used without the installation of the articulated strut 30, then a modular close-out panel 53 can be installed and secured so as to fill in the vacant area and permit the aircraft to be pressurized. As an example and not by way of limitation, as depicted in FIG. 4, a modular close-out panel 53 may include items 74, via the aperture 52, creating a defensive system aperture, which defensive system aperture may be, as an example and not by way of limitation, a directional infrared countermeasures (DIRCM), flare systems and other forms of infrared countermeasures for protection against infrared missiles; chaff (protection against radar-guided missiles); and decoy systems. As an example and not by way of limitation, as depicted in FIG. 3, mechanical retention and securement of the modular close-out panel 53 can be achieved by a plurality of latches 77, so that the aperture 52 becomes sealed, permitting the host aircraft to be pressurized.

In particular embodiments, the modular door panel assembly may incorporate elements suitable for manned observation common to both the single piece door surround and the segmented two-piece door surround incorporating the modular upper panel assembly 54 and the modular lower panel assembly 55. These elements can be installed within any of the single piece door surround, the modular upper panel assembly 54, or the modular lower panel assembly 55. In particular embodiments, these elements may include a window, which, as an example and not by way of limitation, can be made in any shape (such as round, square), and may be protruding or flush so as to be compliant with fuselage outer mold-line of the aircraft. In particular embodiments, these elements may include a panel, which can be made in any shape such as, e.g., flush, convex, concave, and protruding, for receiving the observer's feet or legs.

As an example and not by way of limitation, as depicted in FIGS. 1, 2, 3, and 4, the door surround can include a segmented bubble window assembly 63, which can include clear glazing in its upper portion and a protruding panel 58 in its lower portion. In examples not shown, the segmented bubble window assembly 63 may be in the lower portion of the door surround and the protruding panel 58 in the upper portion of the door surround. The protruding panel 58 can be made of metal, composite, or other suitable materials. As an example and not by way of limitation, the segmented bubble window assembly 63 can also provide for a hinged leaning bar 65 and an air diffuser 64, which can be mechanically ducted and electrically connected to a door surround heater/AC unit 62 and a heater/diffuser/light control unit 61 mounted within the door surround. In particular embodiments, any of the single piece door surround, the modular upper panel assembly 54, or the modular lower panel assembly 55 can provide for various door surround access panels 60, which may provide entrance to the interior of the modular door panel assembly for maintenance purposes, and a gooseneck or other type of night vision goggles (NVG) compatible door surround light 59. Furthermore, the door surround can be powered by various means including a battery, 28-volt DC power and 115-volt AC power coming from the aircraft via an electrical harness connected to aircraft power receptacle.

As part of the mission hardware suite, and as depicted in FIGS. 1, 2, 3, and 4, in particular embodiments, the modular door panel assembly may incorporate an ejection system 67, which may be coupled to the interior of the modular door panel assembly. As an example and not by way of limitation, the ejection system 67 may include one or more ejection ports 66, which one or more ejection tube ports 66 may provide an orifice through any of the single piece door surround, the modular upper panel assembly 54, and/or the modular lower panel assembly 55, in order to enable ejection of an ejection tube port compliant stores from the interior of the aircraft to the exterior of the aircraft. Examples of the ejection tube port compliant stores may include but are not limited to a sonobuoy tube, common launch tube, custom launch tube, and other payloads and stores familiar to those skilled in the art. In particular embodiments, the ejection system 67 may maintain an electrical data link via an umbilical harness or wireless methods to support ejection and provide payload and/or stores power and command, control, and guidance telemetry download. As an example and not by way of limitation, in some embodiments, the umbilical harness may be plugged into the ejection system 67 or a modular valve assembly 68 (which will be further described below), allowing for data transmission through a wired connection, which data transmission can support ejection and provide payload power and command, control, and guidance telemetry download. Additionally or alternatively, the modular valve assembly 68 may use wireless connection for performing similar functions as described above.

In particular embodiments, the ejection system 67 may be capable of being uncoupled or removed from a first position, wherein the ejection system 67 can be coupled to the modular door panel assembly via the modular valve assembly 68, and a second position, wherein the ejection system 67 is uncoupled and/or removed and stowed within the host aircraft. As an example and not by way of limitation, the orifice of the ejection port 66 of the ejection system 67 can be connected to the modular valve assembly 68, which can be located on the inside of the host aircraft. In particular embodiments, the modular valve assembly 68 may provide coupling to ejection system compliant devices, e.g., sonobuoy tube, common launch tube, and/or custom launch tube ejection system compliant devices. Additionally or alternatively, in particular embodiments, the modular valve assembly 68 may maintain aircraft pressurization when coupled to or uncoupled from the ejection system 67. In particular, as an example and not by way of limitation, the modular valve assembly 68 can be manipulated between open and closed positions via position sensors providing data to a controller and actuators to permit pressurized ejection of various ejection system compliant payload and stores while the aircraft is pressurized. As an example and not by way of limitation, when not in use, such as when the space is required for air drop activities, the ejection system 67 can be uncoupled, removed, and stowed.

In particular embodiments, the ejection system 67 may incorporate a simple air expansion technology. This mechanism eliminates the requirement for large bulky pressurization systems or dangerous pyrotechnic discharge devices which are currently used.

In particular embodiments, the single piece door surround and the modular upper panel assembly 54 can also be equipped with door surround lift handles 57 and door surround lock pins 56, which effectively emulate aircraft door lock mechanisms into the fuselage doorway. As an example and not by way of limitation, the segmented two-piece door surround configuration may also incorporate two or more interlocking latches 71, which can enable the modular lower panel assembly 55 and the modular upper panel assembly 54 to be joined for the purpose of scaling the door and pressurizing the aircraft and, additionally or alternatively, allow the modular lower panel assembly 55 to be disengaged from the modular upper panel assembly 54 when a payload has been installed on the modular lower panel assembly 55 or articulated strut 30 is used.

As depicted in FIGS. 1, 2, 3, and 5A-5E, in particular embodiments, the modular door panel assembly may incorporate a scanner seat assembly suitable for engaging in manned search, missile scanning, aerial refueling, and other operations. In particular embodiments, the scanner seat assembly may include a scanner seat 95. As an example and not by way of limitation, the seat 95 can be attached to any of the door surround, the modular upper panel assembly, or the modular lower panel assembly. Additionally or alternatively, the seat 95 may be connected to a cargo handling system rail, e.g., the CRH rail 12, and/or fuselage of the host aircraft via mounting fixtures.

In particular embodiments, the modular door panel assembly may further comprise an articulated stanchion assembly, with which, for example and not by way of limitation, the scanner seat assembly may interface. In particular embodiments, the articulated stanchion assembly can be attached to one or more of the door surround, the modular upper panel assembly, and the modular lower panel assembly. As an example and not by way of limitation, the stanchion assembly may include a support post or a stanchion post, e.g., stanchion post 99, and an extendable pivot arm 97.

In particular embodiments, the scanner seat assembly may further include an assembly or brackets that can be mounted to the fuselage and floor of the aircraft via adaptive mounting fixtures.

As an example and not by way of limitation, in some embodiments, the seat 95 may articulate vertically about the stanchion post 99 by means of the extendable pivot arm 97, with which the seat 95 may interface. The extendable pivot arm 97 can be attached to a stanchion post translation coupling 100 and interface with the stanchion post 99, so as to enable rotation and elevation adjustment about the vertical axis of the stanchion post 99. As an example and not by way of limitation, the seat 95 can also be moved closer to or away from the stanchion post 99 in the horizontal axis by means of an extendable pivot arm assembly 104, which can be housed within an outer assembly of the extendable pivot arm 97.

Additionally or alternatively, the seat 95 may further incorporate translation control levers 98, which can enable the seat 95, and thereby the person seated on the seat 95, to articulate 360 degrees about the vertical axis located at the end of the extendable pivot arm 97. As an example and not by way of limitation, an adjustable slide assembly 101 may allow the operator to adjust their position away from or closer to the vertical axis located at the end of the extendable pivot arm 97, allowing the operator to move the seat 95 into or away from, for example and not by way of limitation, the segmented bubble window assembly 63 of the modular door panel assembly.

In some embodiments, the retractable configuration as described herein may enable the scanner seat assembly to be stowed completely outboard of the path of cargo as it travels forward and aft within the aircraft. It may also enable the scanner seat assembly to be deployed for use in other positions as may be required by the mission or aircraft operational requirements. For example and not by way of limitation, for take-off and landing, the seat 95 can be positioned rearwards for window access, forwards to use a modular workstation, facing outboard for search operations, or 45 degrees aft or forward for air refueling and scanning functions.

Several other mounting locations within the host aircraft have also been contemplated for the scanner seat assembly, which, for example and not by way of limitation, may include mounting the stanchion post 99 and a stanchion post mounting plate 20 onto the aircraft floor 2 and to an alternate fuselage structural flange on a lowered rear ramp of the host aircraft 1, for rearward vision through the aft cargo area.

In particular embodiments, other features could also provide for the integration of armor, footrests, heating pads, shock absorption assemblies, lumbar support, neck support, and other components related to crew comfort and survivability. As an example and not by way of limitation, in particular embodiments, the scanner seat assembly may be provided with a rigid or non-rigid ballistics armor. As an example and not by way of limitation, the scanner seat assembly may be provided with a rigid or non-rigid support structure that distributes energy during aircraft landing.

As depicted in FIGS. 1, 2, 3, and 6, in particular embodiments, the modular door panel assembly may include a modular workstation and control interface assembly for the purpose of launching and/or controlling various payloads and stores, undertaking data processing, communications, and/or other unique systems control functions. As an example and not by way of limitation, the hardware suite required to undertake the control interface functionality and permit stowage outboard of the cargo handling system, e.g., the CRH rail 12 thereof, can include a collapsible modular workstation assembly 112, one or more collapsible armrest-mounted control interfaces 121 that can be located remotely, and at least one or more full height mission electronics line replaceable unit (LRU) racks 111 that can be housed within a cabinet frame.

Figure 6:
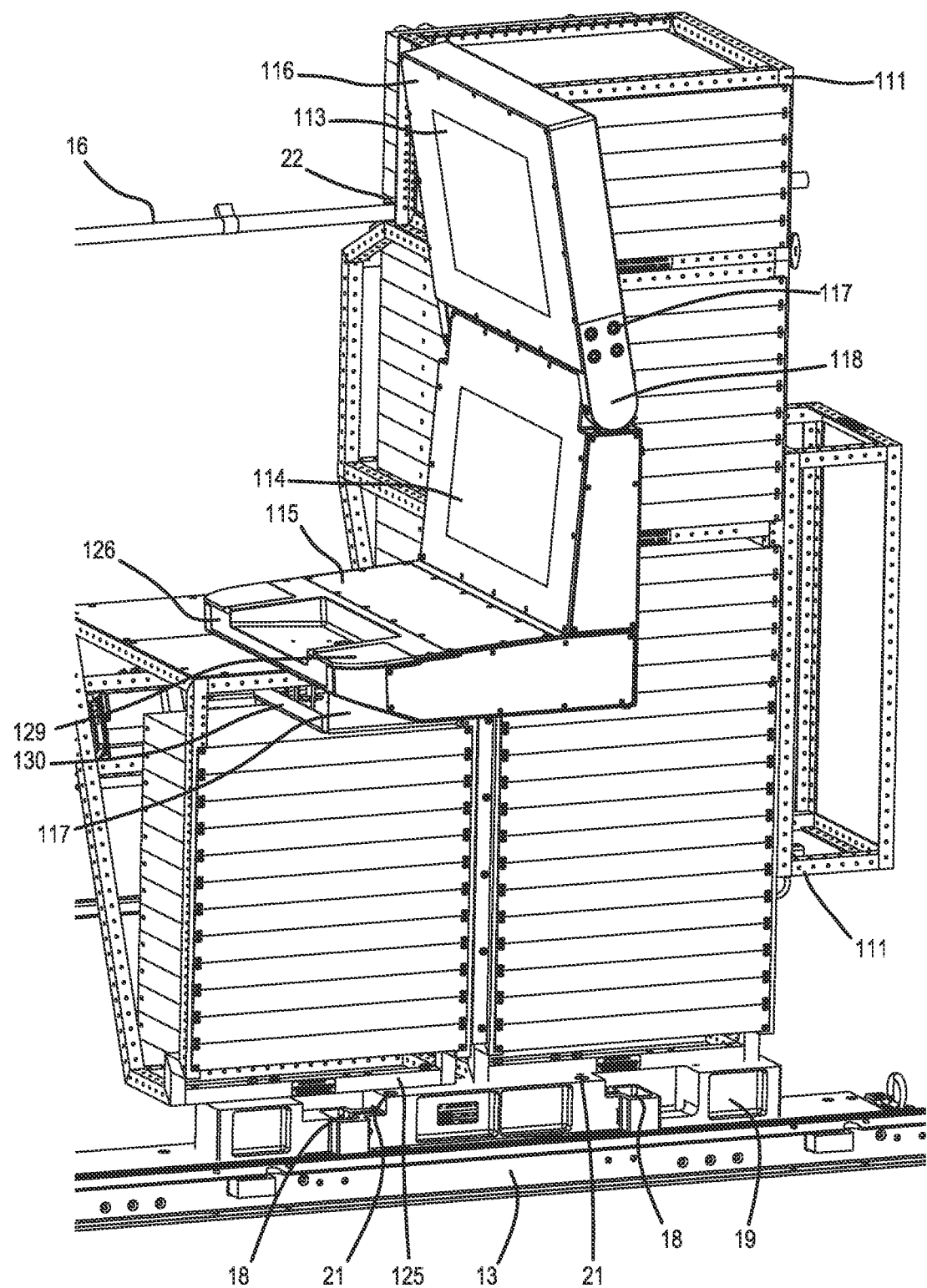
FIG. 6 is a perspective view of a modular workstation and control assembly in the deployed position.

In particular embodiments, as depicted in FIGS. 1 and 6, the collapsible modular workstation assembly 112 can be mounted to the cargo handling system rail, e.g., the CRH rail 12, or fuselage structure via mounting fixtures. The collapsible modular workstation assembly may include an assembly that can be mounted to the floor of the host aircraft via mounting fixtures. As an example and not by way of limitation, the mounted assembly may include a reduced height line replaceable unit (LRU) rack 125 and a full height LRU rack 111, both of which can be contoured to comply with the fuselage curvature typical of the host aircraft 1. For example and not by way of limitation, on the host aircraft 1, the LRU rack can be contoured so as to accommodate fitment outboard of the cargo handling system, e.g., the CRH rail 12, and the cargo transit envelope.

In particular embodiments, the reduced height LRU rack 125 and the full height LRU rack 111 can be connected, by a plurality of restraint assemblies (e.g., one or more restraint bolts 21 and tightening chocks 23 combined), to a LRU rack adaptive mount assembly 19, which can be temporarily or permanently attached to the host aircraft floor 2 by means of the CRH rail 12 and the adaptive floor plate 13 and to the host aircraft fuselage 3. Additionally or alternatively, when required, the reduced height LRU rack 125 and the full height LRU rack 111 can be stabilized vertically by a plurality of attachment clamp assemblies 22, which can be temporarily and permanently affixed to the host aircraft litter bar 16. As an example and not by way of limitation, the reduced height LRU rack 125 and the full height LRU rack 111 generally occupy two mounting positions approximately consistent with the 19 inch rack standard. In this example, the LRU rack positions may be able to accommodate either two full height LRU racks 111 or one collapsible modular workstation 112 mounted to the upper surface of the reduced height LRU rack 125.

In particular embodiments, mounting and utilization of the collapsible modular workstation assembly 112 are also contemplated. As an example and not by way of limitation, the collapsible modular workstation assembly 112 may comprise one or more of a upper display module 113 and a lower display module 114, a human-machine interface module 115, and an electronics and computer module 116. Each of these modules can be physically connected and appropriately hinged to another module or a frame of the collapsible modular workstation assembly 112 via module locking assemblies 117, such that the modules can be moved between a deployed position and a stowed position. As an example and not by way of limitation, all modules incorporated within the collapsible modular workstation assembly 112 can be equipped with module locking hinges, which may use hinge release assemblies 118, and other suitable devices and hinges in order to secure the modules in the stowed position such that the collapsible modular workstation assembly 112 can be collapsed and stowed outboard of the path of cargo as the cargo travels within the aircraft so as to permit aircraft operations.

In particular embodiments, the collapsible modular workstation assembly 112 may accommodate control, display, sound, and input devices including but not limited to a joystick 129, keyboard, track ball/mouse 126, pointing interface, audio interface, display screens, VR headsets, holographic displays and laser displays. The control, display, sound and input devices, for example and not by way of limitation, can be removable to enable stowage as required. As an example and not by way of limitation, the collapsible modular workstation assembly 112 may accommodate protective soft edging 128 to provide an anthropomorphic interface between the operator and the collapsible modular workstation assembly 112.

Further as depicted in FIG. 6, in particular embodiments, because several aircraft types do not have an oxygen supply, mask, and control system for operator use. The collapsible modular workstation assembly 112 may incorporate a self-contained oxygen supply means housed within the frame that can be accessible to the operator, a set of controls, and an oxygen mask 122.

Further as depicted in FIGS. 1, 2, and 3, in particular embodiments, the operator of the collapsible modular workstation assembly 112 may rotate their seat position between the collapsible modular workstation assembly 112 and a scanner position located at the modular door assembly, or that flight crew members located in a cockpit or at other locations on the host aircraft may require remote electronic connectivity to the collapsible modular workstation assembly, as an example and not by way of limitation, the modular scanner seat assembly may incorporate one or more collapsible control interfaces 121 connected to the collapsible modular workstation assembly 112 by electrical harnesses and wireless methods.

In particular embodiments, various components relating to the collapsible modular workstation assembly may be electronically and wirelessly interfaced to the aircraft data bus and connected to the modular escape port 72 as shown in FIG. 1. As an example and not by way of limitation, the modular escape port 72 may be equipped with various types of external surface mounted radio frequency (RF) devices 73 and sensors 75 located on the upper fuselage for line of sight (LOS) and satellite-based beyond line of sight over the horizon (BLOS) command, control, communication and other sensors without permanent modification to the host aircraft or sacrificing emergency crew egress.

FIGS. 7, 8, 9, and 10 delineate example interface methodologies and mechanisms employed with respect to the modular door panel assembly according to the present disclosure. The interface methodologies and mechanisms as presented herein provides the benefit of eliminating the need for palletized systems by incorporating adaptive mounting fixtures that can attach to existing aircraft CRH rails and fuselage structure and cargo tie down rings. The example methodologies and mechanisms are meant only as an example and not as a limitation. This disclosure contemplates any suitable means for connecting the modular door panel assembly to the aircraft.

Figure 9:
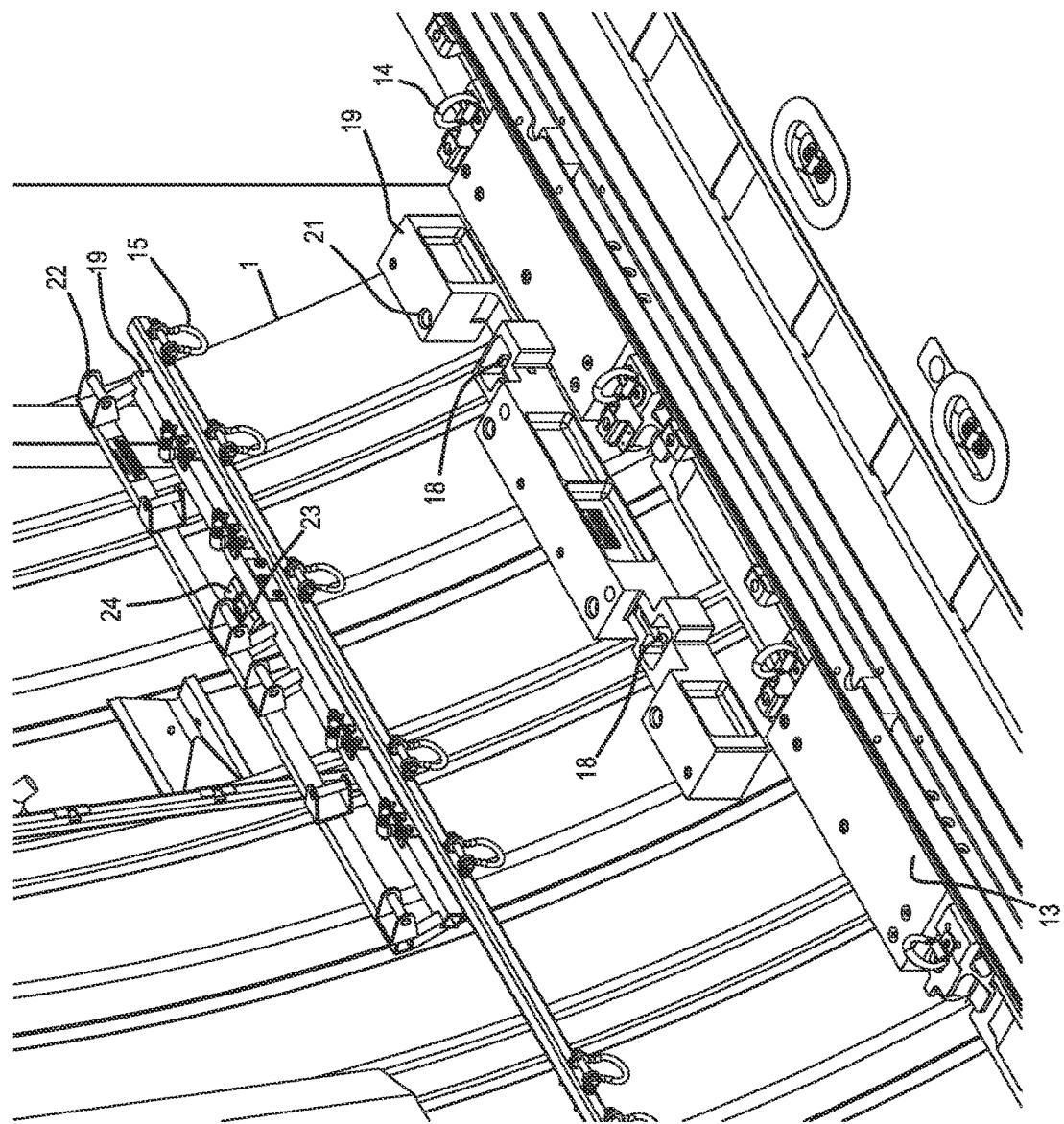
FIG. 9 is a perspective view depicting installation of a line replaceable unit (LRU) rack adaptive mount assembly onto the aircraft floor, more fully delineating the connection of the LRU racks and/or the reduced height LRU racks.
Figure 10:
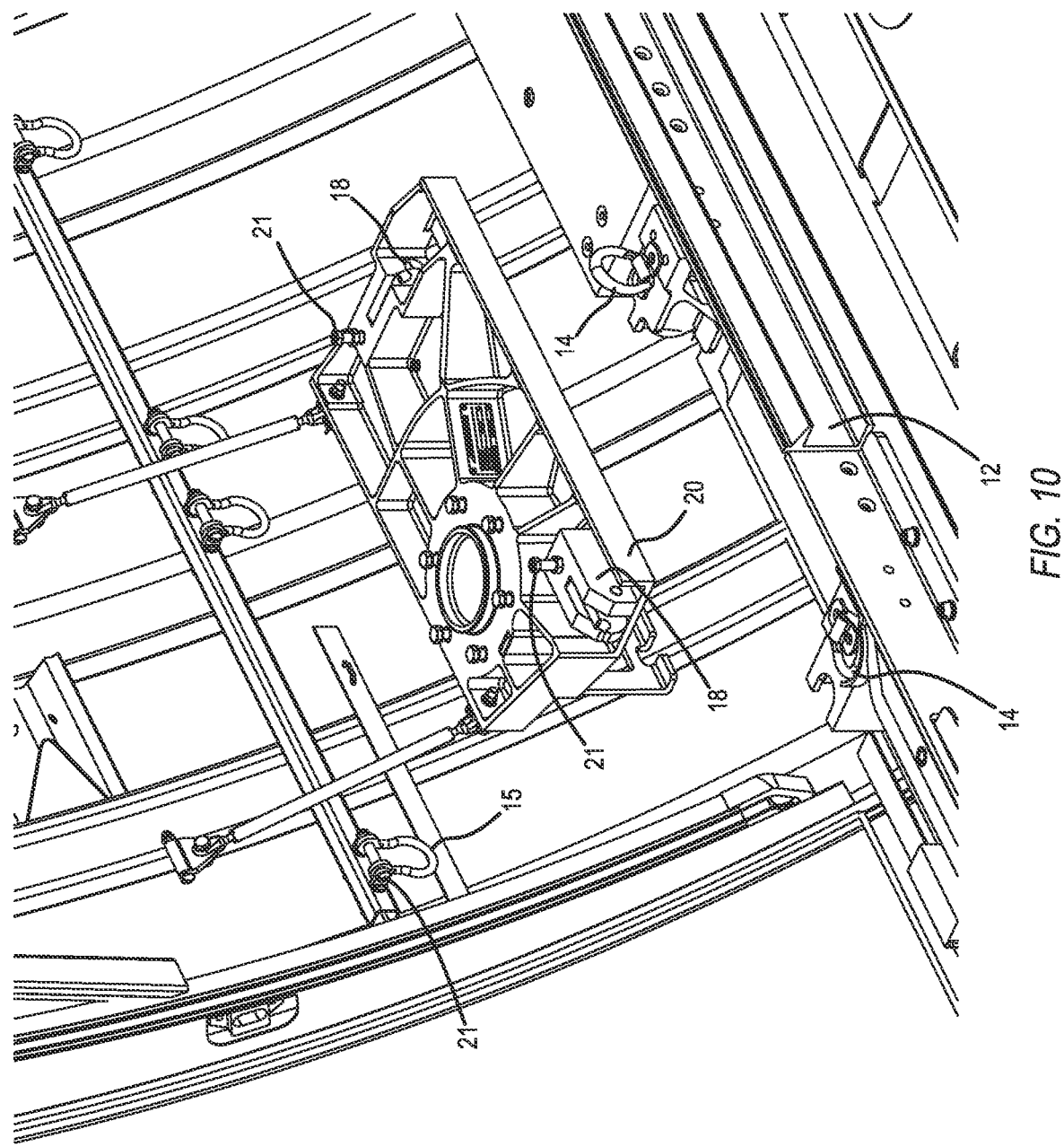
FIG. 10 is a perspective view depicting installation of a modular door panel assembly, more fully delineating the connection of a stanchion post mounting plate.

In particular embodiments, as depicted in FIG. 9, the LRU rack adaptive mount assembly 19 can be connected to several seat belt sockets 24 or the fuselage side, wall mounted D-Ring Fitting using a plurality of self-tightening chocks 23 and multiple pairs of restraint bolts 21, and to the upper surface of the CRH rail 12 using multiple adjustable Restraint locks 18. In the particular embodiments, as depicted in FIG. 10, the stanchion post mounting plate 20 can also be mechanically connected to the upper surface of the CRH rail 12 by means of the adjustable Restraint locks 18 and a plurality of aircraft cargo tic down rings 14.

As an example and not by way of limitation, attachment can be done by using conventional aircraft adjustable Restraint locks, tension restraint devices, or other suitable means of attachment, including means familiar to those skilled in the art. If necessary, for example and not by way of limitation, when installed on a Lockheed-Martin C-130 aircraft, mounting plates such as the LRU rack adaptive mount assembly 19 can be further connected to the host aircraft 1 by removing the temporary web seating bars and the seat belt restraint ring 15 and inserting multiple restraint bolts 21. The stanchion post 99 can be connected to the side of the host Lockheed-Martin C-130 aircraft fuselage at its upper end by means of an upper stanchion brace 102, which can be bolted to a fuselage structural flange 17 by multiple restraint bolts 21.

In particular embodiments, the mounting assemblies can be made of any suitable material, such as aluminum or steel. As an example and not by way of limitation, the mounting assemblies can be made in a shape suitable to match the mating part contour, attaching mechanisms and assemblies of the existing aircraft that provide a surface for securing the various components of the particular embodiments disclosed herein and can be attachable to the aircraft's existing CRH rail and fuselage structure and cargo tie down rings.

Figure 7A:
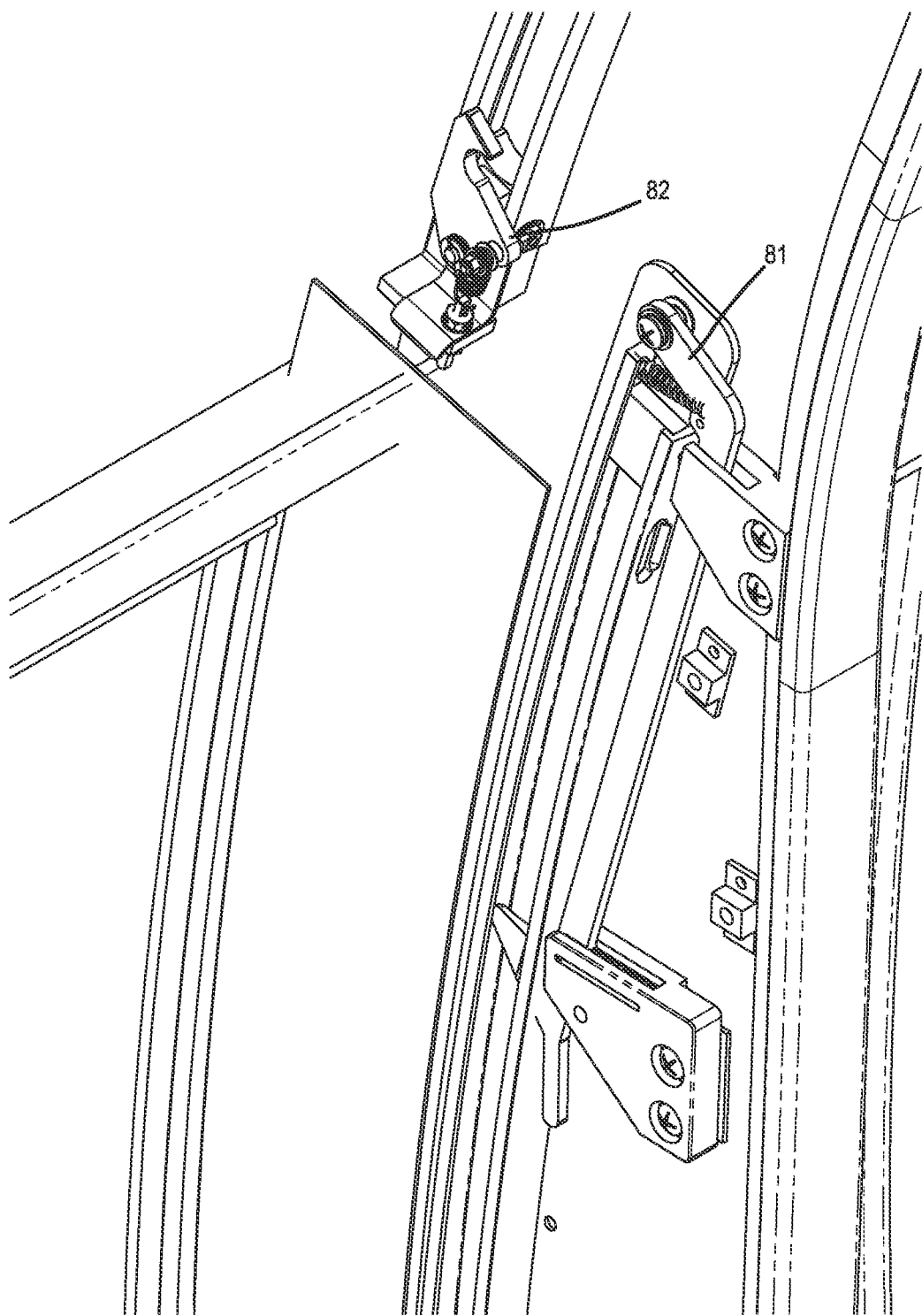
FIG. 7A is a perspective view partially depicting a portion of a retract system.
Figure 7B:
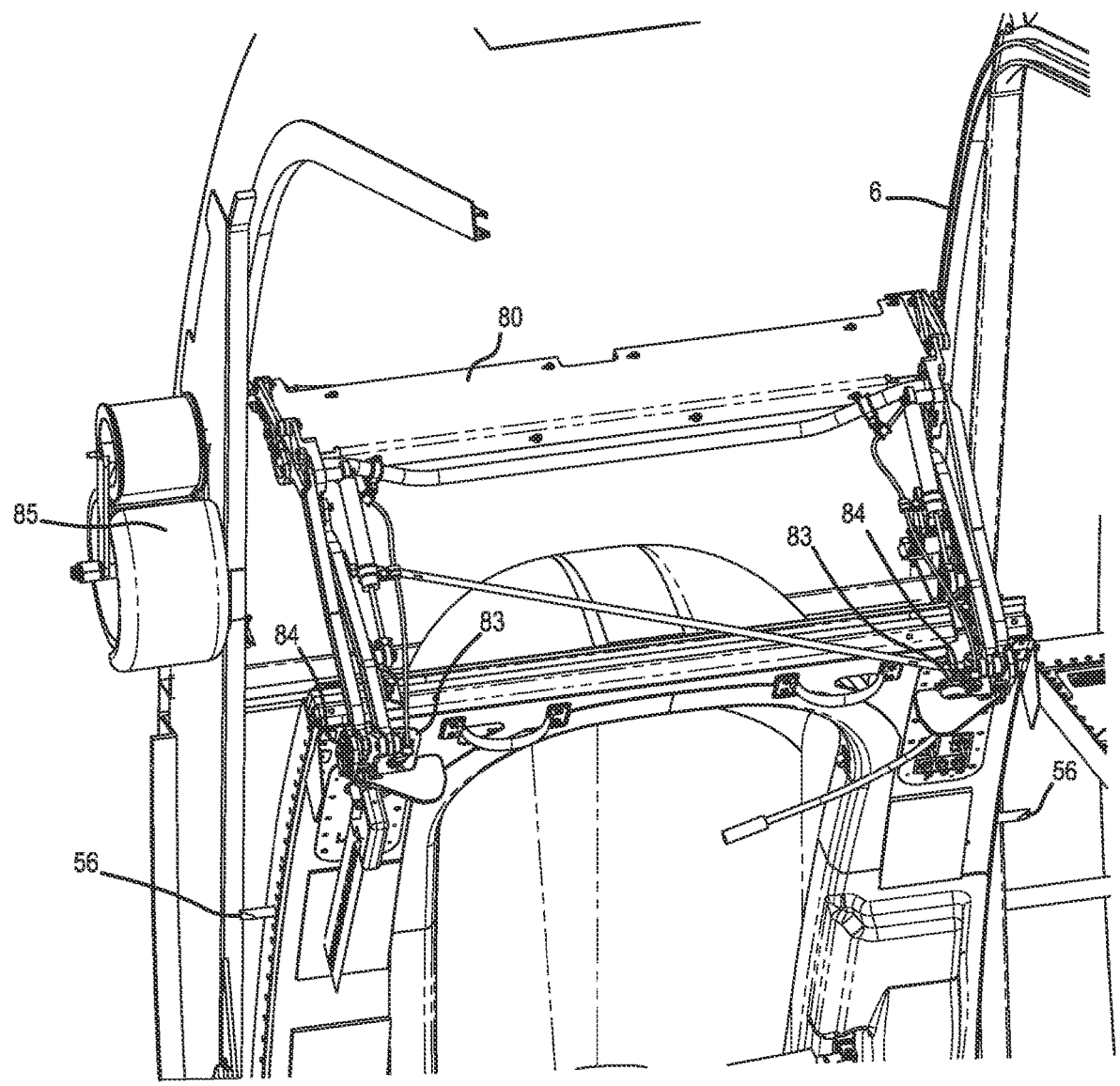
FIG. 7B is a perspective view more fully showing the retract system of FIG. 7A.

FIGS. 7A and 7B illustrate particular embodiments of a retract system. After various retract fittings 83, safety catches 81, and stop blocks 82 are installed, attachment of a retract system 80 can be undertaken. The retract system 80 allows the modular door panel assembly to be opened and moved into a retracted/stowed position while on the ground or in flight. The retract system 80 uses the existing upper and lower door tracks. The retract system 80 allows the modular door panel assembly to follow a modified path and movement sequence during the opening and closing cycle. Upper attachment of the door is provided by a forward and an aft retract fitting 83. The retract fitting 83 is mounted to upper forward and aft retract assembly of the modular door panel assembly via retention pins 84. The retract assembly 80 moves the upper part of the modular door panel assembly inboard before allowing the entire modular door panel assembly to move up towards the retracted position. The retract assembly ensures movement of the door in and out of the door aperture and proper seating of the door seal.

In particular embodiments of the retract system, the retract system includes, for example and not by way of limitation, a variable counterbalance system 85. The counterbalance system 85 is mounted to a support bulkhead of the aft upper door track. The variable counterbalance system 85 accommodates different door weights, e.g., armored vs. not armored. The variable counterbalance system 85 has an adjustable counterbalance cable length that allows the system to accommodate different door lengths, e.g., an Existing C-130 Paratroop Door vs. the modular door panel assembly. The variable counterbalance system 85 is adjustable to be operated with a variety of settings depending on the door configuration with variable spring sizes.

As depicted in FIG. 3, where an aircraft is not equipped with an CRH rail 12, the particular embodiments of the present disclosure may be utilized by installing one or multiple adaptive floor plates 13. The adaptive floor plate 13 may include aircraft type specific bolt patterns unique to the host aircraft.

Figure 11:
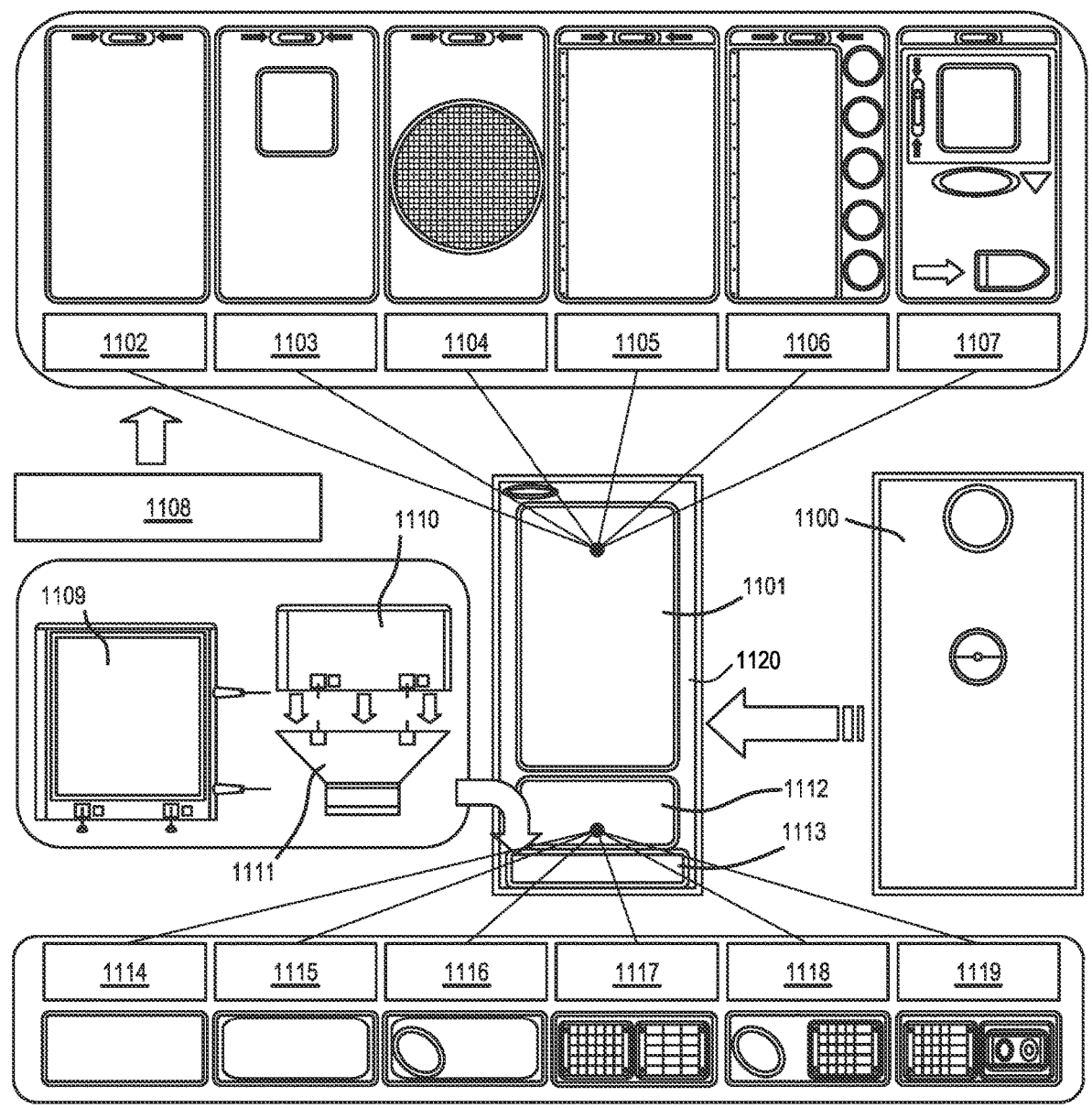
FIG. 11 depicts particular embodiments of a modular door panel assembly, showing various interchangeable panel assemblies that can be incorporated by the modular door panel assembly.

FIG. 11 illustrates various modular panel assemblies which may be used as part of the modular door panel assembly according to the present disclosure. As disclosed previously, the existing door 1100, as an example and not by way of limitation, a paratroop door of the host aircraft, may be replaced by the modular door assembly disclosed herein. In particular embodiments, the modular door panel assembly can be configured to incorporate different mission-specific functionalities by utilizing various modular upper panel assemblies, modular lower panel assemblies, and articulated struts comprising respective mission components in a manner as already described previously with reference to FIGS. 1, 2, 3, and 4. The modular upper panel assembly and the modular lower panel assembly may be placed in the aperture in the upper portion of the door surround and the aperture in the lower portion of the door surround, respectively. In particular embodiments, the modular upper panel assembly and the modular lower panel assembly that interface with the door surround can be pressurized to ensure aircraft pressurization. As an example and not by way of limitation, integration and installation of any of the modular panels disclosed herein may be accomplished by way of structural fasteners common to the aviation industry. Such fasteners would be used to connect all the different parts together as primary structural areas, secondary structure, pressurized and non-pressurized applications, and to transfer loads from one part to another.

As depicted in FIG. 11, as an example and not by way of limitation, the modular upper panel assembly 1101 may include at any given time: a flush upper panel 1102 that may be compliant with fuselage outer mold-line of the host aircraft; a square or other geometric shaped transparency panel 1103, as an example and not by way of limitation, comprising a window; a RF permeable panel 1104; a flush or protruding transparency panel 1105, as an example and not by way of limitation, comprising a window that may be compliant with fuselage outer mold-line of the host aircraft or a protruding window that may be non-compliant with fuselage outer mold-line of the host aircraft; a protruding window and ejection port panel 1106 comprising the protruding window and one or more ejection ports such as the ejection port 66 as described with reference to FIGS. 1 through 4; or an auxiliary power unit (APU) panel 1107 comprising an APU that can be configured as an auxiliary electrical power supply to drive various components or systems onboard the host aircraft.

As depicted in FIG. 11, as an example and not by way of limitation, the modular lower panel assembly 1112 may include at any given time: a flush lower panel 1114 that may be compliant with fuselage outer mold-line of the host aircraft; a protruding panel 1115 such as the protruding panel 58 as described with reference to FIGS. 1, 2, 3, and 4; a protruding panel and ejection port panel 1116 comprising a protruding panel and one or more ejection ports such as the ejection port 66 as described with reference to FIGS. 1, 2, 3, and 4; a multi-dispenser system panel 1117 comprising a multi-dispenser system aperture that may accommodate, for example and not by way of limitation, an ALE 47 launcher or other suitable dispensing system components; a multi-dispenser system and ejection port panel 1118 comprising the multi-dispenser system aperture and one or more ejection ports; or a multi-dispenser system and external sensing system panel 1119 comprising the multi-dispenser system aperture and an external sensing system, for example and not by way of limitation, an ALE 47 launcher and a missile approach warning system AAR-47. Alternatively or additionally, in particular embodiments, the modular lower panel assembly 1112 may include other suitable components to support other systems and missions. As an example and not by way of limitation, although not shown, the modular lower panel assembly 1112 may include at least one payload deployment port, which permits door aperture compliant payloads of various autonomous configurations or cargo being exited from the interior to the exterior of the host aircraft while maintaining aircraft pressurization. As an example and not by way of limitation, although not shown, the modular upper panel assembly 1101, the modular lower panel assembly 1112, and the modular close-out panel assembly 1113 may include at any given time any assortment of embodiments described herein and can be installed within different vertical positions and orientations as required.

As depicted in FIG. 11, as an example and not by way of limitation, the modular close-out panel assembly 1113 may include at any given time an articulated strut 1109, which may include a payload support aperture 1111. As an example and not by way of limitation, the modular close-out panel assembly 1113 may include a segmented articulated strut 1110 that may be attached to an adaptive fairing via the payload support aperture 1111. Actuation of particular embodiments may be accomplished, for example and not by way of limitation, by elevator drive system, four link drive system, harmonic drive system, and induction drive system. Whereas a drive system may include but not limited to hydraulic assisted actuation, electrical drive assisted actuation, and pneumatic assisted actuation.

Although the present disclosure describes the modular door panel assembly as having respective mission-specific functionalities in a particular design or combination, various other suitable functionalities and designs or combinations thereof are also contemplated within the scope of the present disclosure. Certain embodiments disclosed herein may provide none, some, or all of the above functionalities. For example and not by way of limitation, in particular embodiments, the modular upper panel assembly may serve as an emergency egress hatch 1108. Additionally or alternatively, the modular lower panel assembly may serve as an emergency egress hatch. In particular embodiments, the first aperture accommodating the modular upper panel assembly or the second aperture accommodating the modular lower panel assembly or both apertures together can be configured to serve as an emergency egress hatch.

Although not shown in FIG. 11, the modular door panel assembly may comprise additional functionalities so as to provide more adaptability for performing various airborne missions through use of at least one of the modular upper panel assemblies, the modular lower panel assemblies, and the modular close-out panel assembly. In particular embodiments, at least one of the modular upper panel assemblies, the modular lower panel assemblies, and the modular close-out panels assemblies may have side nadir and zenith scan coverage. In particular embodiments, at least one of the modular upper panel assemblies and the modular lower panel assemblies may comprise a transparency compliant with optical, multi and hyper-spectral sensors, electro-optical, electro-magnetic, laser detection and ranging (LIDAR), visual detection and ranging (VIDAR) and object detection and ranging sensors. In particular embodiments, the modular door panel assembly may comprise a rigid or non-rigid ballistics armor covering the interior surface of the modular door panel assembly. In particular embodiments, the modular door panel assembly may comprise a rigid or non-rigid electromagnetic spectrum shielding covering the exterior and/or interior surface and/or peripheral pressurization seal of the modular door panel assembly. In particular embodiments, as an example and not by way of limitation, the modular door panel assembly may comprise a ruggedized environmental storage and loading container. In particular embodiments, the modular door panel assembly may comprise one or more side coverage modular inserts, which may provide: a protruding or flush mount radome panel to support at least one of optical sensors, multi-spectral sensors, hyper-spectral sensors and electro-optical sensors; a protruding or flush mount radome panel to support electromagnetic spectrum sensors; an optical glass insert for hyperspectral or other electro-optical (EO) sensors; a GPS/SATCOM antenna with or without Articulated Sensor Assembly (for example, any sensor that rotates on its own or has to be rotated into position and then stays fixed while transmitting through the door); or an upper and/or lower panel auxiliary power unit (APU) assembly.

Method of Operation

The method of operation is described in conjunction with FIGS. 1 through 6 and includes methodologies generally known in the art. Therefore, particular details known to those skilled in the art are not described in exhaustive detail herein.

As an example and not by way of limitation, by way of sequencing, in general, the mounting assemblies of the particular embodiments disclosed herein can be mounted first on their respective components, or they can be mounted first on the aircraft such as on the aircraft's CRH rail. For the sake of simplicity, in the example methodology described herein, various mounting assemblies are considered to have been already attached to their respective components. In particular embodiments, the methodology of installation and operation as described herein is divided into seven functional areas. Further, although various embodiments disclosed herein can be utilized on various types of aircraft, the methodology below is described, by way of example, with respect to a rear-loading C-130 type aircraft.

System Transport and Loading

Upon notification of a mission, a ground crew that may comprise two individuals could transport particular embodiments disclosed herein within a plurality of man portable, ruggedized transport cases to the host aircraft. After an initial confirmation that the host aircraft is ready, the rear ramp could be lowered and the transport cases could be loaded onto the host aircraft. In a particular embodiment, loading can be achieved without the use of a mechanized loader, since the components and assemblies of the present disclosure are light enough that two individuals can undertake the loading and installation.

Aircraft Preparation

Initially, an install crew could open, stow, or remove one or more side door(s), such as a left side paratrooper door, in order to create an orifice with which to accommodate fitment of the modular door panel assembly. One or more of the upward host aircraft ditching hatches could also be removed to accommodate one or more modular escape ports 72 so as to provide specialized mission telemetry and communications capabilities. Once the host aircraft ditching hatch has been removed, the web seating bench located forward of the paratroop door(s) can be removed and stowed. If the articulated strut 30 is used with the particular embodiments, then a section of the existing CRH rail 12 could also be removed to accommodate its installation abreast of the open doorway.

Workstation and Control Interface Assembly

Installation of the various electronics and user interface assemblies of the particular embodiments disclosed herein begins with the full height LRU rack 111 and the reduced height LRU rack 125. As an example and not by way of limitation, as stated in the operational description, these components can be pre-connected to the LRU rack adaptive mount assembly 19, which in turn is temporarily or permanently attached to the host aircraft floor 2 and the host aircraft fuselage 3 by means of the CRH rail 12 or the adaptive floor plate 13. The fastening methodologies used as described herein can include interfacing to the plurality of aircraft cargo tie down rings 14, removing the seat belt restraint rings 15, and affixing to the host aircraft litter bar 16 using a plurality of restraint assemblies 21 and attachment clamps 22. Once the reduced height LRU rack 125 is installed together with the collapsible modular workstation assembly 112, the installation crew could attach it to the top of the reduced height LRU rack 125 using a plurality of collapsible workstation support assemblies 130. The installation crew could then extend the collapsible modular workstation assembly 112 by releasing a plurality of module locking assemblies 117 by depressing multiple hinge release assemblies 118. Once fully extended and secured to the top of the reduced height LRU rack 125, a crew member could utilize the track ball/mouse 126 and/or the joystick 129 and/or the human-machine interface module 115. At this point in the installation process, the collapsible workstation 112, the full height LRU rack 111, the reduced height LRU rack 125, and the modular escape port 72 can be interconnected by a command control communication and computer harness and power harness from the host aircraft using materials and methods familiar to those skilled in the art.

Scanner Seat Assembly

The seat 95, which may be equipped with a pair of armrests 96, a translation control lever 98, and an adjustable slide plate 101, could be pre-assembled with the stanchion post 99 and integrated with the stanchion post translation coupling 100, the extendable pivot arm 97, and the upper stanchion brace 102 in one assembly. The size and weight of this assembly can be quite manageable by two crew members. As an example and not by way of limitation, the crew members can connect the stanchion post mounting assembly 20 to the host aircraft fuselage and floor 2 via the CRH rail 12, and an adaptive floor plate 13 using the adjustable clamp assembly and Restraint locks 18, interfacing to the plurality of aircraft cargo tic down rings 14. Additionally or alternatively, the stanchion post 99 can be secured at the upper end to the host aircraft fuselage 3 by an upper stanchion brace 102 and a plurality of restraint assemblies 21, which can be connected to the fuselage structural flange 17 on the host aircraft. Once the seat 95 is installed, the crew can access the collapsible armrest-mounted control interface 121 and the seat armrest 96 and then connect them to the collapsible modular workstation assembly 112 by means of command control communication and computer harness and power harness. In particular embodiments, depending on the nature of the requirements for user interfaces, the collapsible armrest-mounted control interface 121 may be positioned simultaneously at multiple locations in the aircraft, necessitating a variety of temporarily installed command control communication and computer harness and power harness configurations familiar to those skilled in the art.

Door Surround Assembly

Installation of the retract assembly 80, for the purposes of describing the methodology, assumes that either of the single piece door surround or the two-piece door surround comprising the modular upper panel assembly 54 and the modular lower panel assembly 55 is pre-assembled with the retract fittings 83. In a particular embodiment, the design addresses the installation of the complete door surround assembly by two individuals by removing the upper track stop pins and aligning the retract assembly 80 within the existing aircraft door retraction rail upper guides 6. Once the retract assembly 80 is aligned within the existing aircraft door retraction rail upper guides 6, the stop blocks 82 are installed in place of the removed existing stop pins. The opposing end of the retract assembly 80 is attached to upper corners of the modular door panel assembly at the retract fittings 83 and secured via the retention pins 84. The lower parts of the modular door panel assembly are connected to the host aircraft using the fore and aft lower rollers 86, which can interface within the existing aircraft door retraction rail lower guides 7. Once the modular door assembly has been installed, the ejection system modular valve assembly 68 can be removed from its case and attached to the modular door assembly. The ejection tube comprising majority of the ejection system 67 can be physically attached to the modular valve assembly 68.

In Flight Operation

With various embodiments as described herein in the deployed position aboard the host aircraft, the crew can engage in manned search or scanning operations, including those associated with the modular upper panel assemblies and the modular lower panel assemblies. For example and not by way of limitation, the modular upper panel assemblies and modular lower panel assemblies respectively received in the upper portion and lower portion of the upper door surround can accommodate various system-specific components such as a window, a protruding panel, an ejection port, or other suitable components as described previously in a way that supports such operations. As depicted in FIGS. 5A through 5E, the seat 95 can be rotated about the stanchion post 99 to move back and forth between the collapsible modular workstation assembly 112 and the bubble window assembly 63. In particular embodiments, the operator is also able to rotate their seat through 360 degrees about the vertical axis located at the end of the extendable pivot arm 97 to achieve various viewing positions, including positions advantageous for take-off or landing, lateral scanning, or other tasks, or 45 degrees in either forward or aft positions. Further, depending on height adjustment, the seat 95 can be elevated in the vertical direction about the stanchion post 99 by means of the stanchion post translation coupling 100. As an example and not by way of limitation, when viewing subjects of interest from the bubble window assembly 63, the operator can adjust the seat 95 forward and backward with respect to the window envelope using the adjustable slide assembly 101 and the translation control lever 98. All adjustments and articulations can be achieved by known means familiar to those skilled in the art.

As depicted in FIG. 2, in particular embodiments, when the observer seat is not required, or when aircraft operations are being undertaken, the seat 95, the collapsible modular workstation assembly 112, and the ejection system 67 can be folded away outboard of the CRH rail 12 or cargo envelope. As an example, and not by way of limitation, this would allow pallets and other cargo to transit towards the rear of the aircraft for deployment operations. In particular embodiments, when the host aircraft is engaged in paratroop drop operations through the door aperture which the particular embodiments described herein is mounted in, then the door surround assembly latch mechanisms can be disengaged by the door handle 76 located, which can be opened upward as it could normally operate to allow the paratroopers to egress without being constrained by the various components and appendages of the particular embodiments described herein. Thus, the modular door assembly can be moved out of the way for egress.

When utilizing the ejection system 67, images from various jettisoned ejection system compatible stores and payloads can be received by the host aircraft. With the workstation and control assembly installed, dynamically launched unmanned autonomous systems (UASs) can be tasked and data can be analyzed by the host aircraft and then relayed to other aircraft, surface assets, or to distant control centers using LOS or BLOS communications systems integrated to the host aircraft by the modular escape port 72. Further, when deploying multiple ejection system stores or payloads or like packages, the modular escape port 72 can provide telemetry data such that a set of coordinated positions can be determined for precision delivery of the ejection system stores or payloads, particularly if the ejection system 67 is equipped with multiple ejection ports.

It could be obvious to those skilled in the art that the overall assembly of various embodiments as described herein has extensive ability to interface with and otherwise accommodate other systems when augmented with external sensors, communications, electronic systems, UAS's or other stores, which are not described in detail herein. As an example and not by way of limitation, in the event of time-sensitive airborne missions, the modular door panel assembly of this disclosure can be quickly adapted to incorporate various system components. For example and not by way of limitation, a window, a leg panel, a work station and control interface assembly, a scanner seat assembly, and other suitable mission-specific assemblies that can be readily mounted to the existing door aperture of the aircraft in a way as described above, without dedicated modification to the aircraft or compromise on mission system performance.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A modular door panel assembly for an aircraft, comprising:
   a door surround, wherein the door surround interfaces with a door aperture of the aircraft to ensure aircraft pressurization;
   a first hole in an upper portion of the door surround, wherein the first hole is configured to accommodate a modular upper panel assembly such that a portion of the door surround around the first hole is capable of interfacing with the modular upper panel assembly to ensure aircraft pressurization;
   a second hole in a lower portion of the door surround, wherein the second hole is configured to accommodate a modular lower panel assembly such that a portion of the door surround around the second hole is capable of interfacing with the modular lower panel assembly to ensure aircraft pressurization; and
   a strut actuator aperture, wherein the strut actuator aperture is below the second hole and is configured to interface with an articulated strut to ensure pressurization.

2. The modular door panel assembly of claim 1, wherein the door surround is permanently installed.

3. The modular door panel assembly of claim 1, wherein the door surround is temporarily installed.

4. The modular door panel assembly of claim 1, further comprising an articulated stanchion assembly, wherein the articulated stanchion assembly is attached to the door surround, the modular upper panel assembly, the modular lower panel assembly, or the articulated strut.

5. The modular door panel assembly of claim 1, wherein the modular door panel assembly is further configured to interface with a control system via a harness assembly.

6. The modular door panel assembly of claim 1, further comprising a seat, wherein the seat is attached to at least one of the door surround, the modular upper panel assembly, or the modular lower panel assembly.

7. The modular door panel assembly of claim 1, wherein the modular upper panel assembly comprises a square window.

8. The modular door panel assembly of claim 1, wherein the modular upper panel assembly comprises a protruding window.

9. The modular door panel assembly of claim 1, wherein the modular upper panel assembly comprises at least one ejection tube port.

10. The modular door panel assembly of claim 1, wherein the modular lower panel assembly comprises a protruding leg panel.

11. The modular door panel assembly of claim 1, wherein the modular upper panel assembly comprises one or both of a protruding leg panel and an ejection tube port.

12. The modular door panel assembly of claim 1, wherein the modular lower panel assembly comprises a defensive system aperture.

13. The modular door panel assembly of claim 1, wherein the modular lower panel assembly comprises at least one payload ejection port.

14. The modular door panel assembly of claim 1, wherein the modular lower panel assembly comprises a protruding window.

15. The modular door panel assembly of claim 1, wherein the door surround replaces an existing door of the aircraft, an emergency exit, or an escape port.

16. The modular door panel assembly of claim 1, wherein the door surround is compliant with fuselage outer mold-line.

17. The modular door panel assembly of claim 1, wherein at least one of the modular upper panel assembly and the modular lower panel assembly has side nadir and zenith scan coverage.

18. The modular door panel assembly of claim 1, wherein at least one of the modular upper panel assembly and the modular lower panel assembly comprises a transparency compliant with optical, multi and hyper-spectral sensors or electro-optical sensors.

19. The modular door panel assembly of claim 1, wherein the first hole, the second hole or both the first hole and the second hole individually or together are configured to serve as an emergency egress hatch.

20. The modular door panel assembly of claim 1, wherein the modular upper panel assembly comprises a flush window that is compliant with fuselage outer mold-line.

21. The modular door panel assembly of claim 1, wherein at least one of the modular upper panel assembly and the modular lower panel assembly comprises a transparency compliant with electromagnetic spectrum.

22. The modular door panel assembly of claim 1, wherein at least one of the modular upper panel assembly and the modular lower panel assembly comprises at least one of an ejection tube port and an auxiliary power unit (APU).

23. The modular door panel assembly of claim 1, wherein the upper portion of the door surround and the lower portion of the door surround are continuous with each other.

24. The modular door panel assembly of claim 1, further comprising a retract track fixture connecting the door surround and the door aperture of the aircraft.

25. The modular door panel assembly of claim 1, further comprising one or more collapsible modular workstation assemblies mounted to a cargo handling system rail via adaptive mounting fixtures.

26. The modular door panel assembly of claim 1, further comprising a scanner seat assembly connected to a cargo handling system rail and fuselage via adaptive mounting fixtures.

27. The modular door panel assembly of claim 1, further comprising one or more collapsible modular workstation assemblies mounted to a floor of the aircraft via adaptive mounting fixtures.

28. The modular door panel assembly of claim 1, further comprising a scanner seat assembly connected to a floor of the aircraft via adaptive mounting fixtures.

29. The modular door panel assembly of claim 25, wherein the one or more collapsible modular workstation assemblies are configured to be positioned outboard of a path of cargo as the cargo travels forward and aft within the aircraft.

30. The modular door panel assembly of claim 26, wherein the scanner seat assembly is configured to be positioned outboard of a path of cargo as the cargo travels forward and aft within the aircraft.

31. The modular door panel assembly of claim 1, wherein when the articulated strut is not installed, a close-out panel is installed and secured via a plurality of latch mechanisms to permit an interior of the aircraft to be pressurized.

32. The modular door panel assembly of claim 1, further comprising an ejection system, wherein the ejection system permits ejection of an ejection system compliant payload from an interior of the aircraft to an exterior of the aircraft.

33. The modular door panel assembly of claim 32, wherein the ejection system is coupled to an interior of the modular door panel assembly, wherein the ejection system is capable of being uncoupled or removed from: a first position wherein the ejection system is coupled to the modular door panel assembly via a modular iris valve assembly; and a second position wherein the ejection system is uncoupled or removed and stowed within the aircraft.

34. The modular door panel assembly of claim 33, wherein the modular iris valve assembly maintains aircraft pressurization when coupled to or uncoupled from the ejection system.

35. The modular door panel assembly of claim 33, wherein the ejection system maintains an electrical data link via an umbilical harness or wireless methods to support ejection and provide payload power and command, control, and guidance telemetry download.

36. The modular door panel assembly of claim 25, wherein the one or more collapsible modular workstation assemblies comprise one or more modules, wherein the one or more modules comprise one or more of a display module, a human-machine interface module, and a computer module; and each of the one or more modules is physically connected via one or more hinges to another module or a frame of the collapsible modular workstation assembly, wherein the one or more hinges enable the one or more modules to be moved between a deployed position and a stowed position; and each of the one or more modules comprise a module locking hinge to secure the one or more modules in the stowed position.

37. The modular door panel assembly of claim 33, wherein the modular iris valve assembly provides coupling to at least one of a sonobuoy tube, a common launch tube and custom launch tube ejection system compliant devices.

38. The modular door panel assembly of claim 1, further comprising a rigid or non-rigid ballistics armor covering, wherein the ballistics armor covering covers an interior surface of the modular door panel assembly.

39. The modular door panel assembly of claim 1, further comprising a scanner seat assembly, wherein the scanner seat assembly comprises a support post that interfaces with a cargo handling system via a floor of the aircraft, an extendable pivot arm that interfaces with the support post, and a scanner seat that interfaces with the extendable pivot arm, wherein the scanner seat assembly allows an observer to move the scanner seat into a position to scan through the modular door panel assembly.

40. The modular door panel assembly of claim 39, wherein the scanner seat assembly is adjustable in rotational and translational directions while the observer is seated.

41. The modular door panel assembly of claim 39, further comprising a rigid or non-rigid ballistics armor covering, wherein the armor covering covers an exterior surface of the scanner seat assembly.

42. The modular door panel assembly of claim 39, further comprising a rigid or non-rigid support structure, wherein the support structure and/or material is configured to distribute energy during aircraft landing.

43. The modular door panel assembly of claim 31, wherein the modular upper panel assembly, the modular lower panel assembly, and/or the close-out panel is configured to provide one or more side coverage inserts, wherein the side coverage inserts provide:
  a protruding or flush mount radome panel configured to support at least one of optical sensors, multi-sensors, hyper-spectral sensors and electro-optical sensors;
  a protruding or flush mount radome panel configured to support electromagnetic spectrum sensors;
  an optical glass insert configured for use with hyper-spectral sensors or other EO sensors;
  a GPS/SATCOM antenna with or without Articulated Sensor Assembly; or
  an APU assembly.

44. The modular door panel assembly of claim 1, further comprising a rigid or non-rigid electromagnetic spectrum shielding covering an exterior and/or interior surface and peripheral pressurization seal of the modular door panel assembly.

* * * * *